June 26, 1962 E. V. MONTROSS ET AL 3,040,860

RECORD CARD FEEDING DEVICES

Filed Oct. 13, 1960 14 Sheets-Sheet 1

INVENTORS
EUGENE V. MONTROSS
DOUGLAS E. CLANCEY &
PAUL L. BROBST

BY Louis A Kline
J Lavender

THEIR ATTORNEYS

June 26, 1962 E. V. MONTROSS ET AL 3,040,860

RECORD CARD FEEDING DEVICES

Filed Oct. 13, 1960 14 Sheets-Sheet 2

INVENTORS
EUGENE V. MONTROSS &
DOUGLAS E. CLANCEY &
PAUL L. BROBST

BY Louis A. Kline
J. Kauender
THEIR ATTORNEYS

INVENTORS
EUGENE V. MONTROSS
DOUGLAS E. CLANCEY &
PAUL L. BROBST
BY Louis A. Kline
[signature]
THEIR ATTORNEYS

INVENTORS
EUGENE V. MONTROSS
DOUGLAS E. CLANCEY &
PAUL L. BROBST

BY Louis A. Kline

J. Lavender

THEIR ATTORNEYS

INVENTORS
EUGENE V. MONTROSS
DOUGLAS E. CLANCEY &
PAUL L. BROBST
BY Louis A. Kline
[signature]
THEIR ATTORNEYS June 26, 1962 E. V. MONTROSS ET AL 3,040,860

RECORD CARD FEEDING DEVICES

Filed Oct. 13, 1960 14 Sheets-Sheet 6

INVENTORS
EUGENE V. MONTROSS
DOUGLAS E. CLANCEY &
PAUL L. BROBST

BY Louis A Kline

J Lavender

THEIR ATTORNEYS

INVENTORS
EUGENE V. MONTROSS
DOUGLAS E. CLANCEY &
PAUL L. BROBST
BY Louis A Kline
J Havender
THEIR ATTORNEYS

RECORD CARD FEEDING DEVICES

Filed Oct. 13, 1960 14 Sheets-Sheet 8

INVENTORS
EUGENE V. MONTROSS
DOUGLAS E. CLANCEY &
PAUL L. BROBST

BY Louis A. Kline
J. Cavender

THEIR ATTORNEYS

INVENTORS
EUGENE V. MONTROSS
DOUGLAS E. CLANCEY &
PAUL L. BROBST

BY

THEIR ATTORNEYS

RECORD CARD FEEDING DEVICES

Filed Oct. 13, 1960 14 Sheets-Sheet 10

INVENTORS
EUGENE V. MONTROSS
DOUGLAS E. CLANCEY &
PAUL L. BROBST
BY Louis A. Kline
J. Havender
THEIR ATTORNEYS

RECORD CARD FEEDING DEVICES

INVENTORS
EUGENE V. MONTROSS
DOUGLAS E. CLANCEY &
PAUL L. BROBST
BY Louis A Kline
J Havender
THEIR ATTORNEYS June 26, 1962 E. V. MONTROSS ET AL 3,040,860

RECORD CARD FEEDING DEVICES

Filed Oct. 13, 1960 14 Sheets-Sheet 12

INVENTORS
EUGENE V. MONTROSS
DOUGLAS E. CLANCEY &
PAUL L. BROBST

BY Louis A. Kline

J. Flavender

THEIR ATTORNEYS

RECORD CARD FEEDING DEVICES

Filed Oct. 13, 1960 14 Sheets-Sheet 13

INVENTORS
EUGENE V. MONTROSS
DOUGLAS E. CLANCEY &
PAUL L. BROBST
BY Louis A. Kline
J. Cavender
THEIR ATTORNEYS INVENTORS
EUGENE V. MONTROSS
DOUGLAS E. CLANCEY &
PAUL L. BROBST
BY Louis A Kline
J Cavender
THEIR ATTORNEYS 3,040,860
RECORD CARD FEEDING DEVICES
Eugene V. Montross, Bellbrook, and Douglas E. Clancy and Paul L. Brobst, Dayton, Ohio, assignors to The National Cash Register Company, Dayton, Ohio, a corporation of Maryland
Filed Oct. 13, 1960, Ser. No. 62,459
11 Claims. (Cl. 197—127)

The present invention relates generally to record feeding devices and more particularly relates to a new and improved magnetic ledger card feeding device adapted to be utilized in conjunction with a record keeping machine as an input-output device for an electronic digital computing machine.

With the ever-increasing enormousness and complexity of record keeping and accounting systems in the business world of today, there is accordingly an ever-increasing demand, by necessity, for the adaptation and utilization of high-speed mechanization techniques compatible with such systems. Even though the installation of large-scale data processors and electronic computing equipment has partially satisfied the needs of the larger business establishments, unfortunately they are not economically within the realm of practical usage by the smaller business establishments. Accordingly, as fully shown and described in copending United States patent application Serial No. 859,598, filed December 15, 1959, by Patrick B. Close et al., and assigned to the present assignee, there has been devised a new and improved low-cost electronic digital computer which is of the general-purpose type in that it possesses substantially unlimited arithmetic and programming capabilities, and yet is characterized by extreme simplicity of operation and compatibility with present-day record keeping and accounting systems. Among various other input media, such a computer is adapted to receive input media in the form of magnetic ledger cards having fixed, historical, and current data both printed and magnetically recorded thereon to be utilized for computational purposes. As an incident to the computing operation, the computer is capable of automatically updating the ledger card data in both its printed human-readable and its magnetically recorded machine-readable sections, in addition to producing a printed journal sheet and other output documents.

A principal object of the present invention is to devise a new and improved magnetic ledger card handling device for a record keeping machine which is to be utilized as an input-output device by an electronic digital computing machine in the manner disclosed in the above-mentioned copending patent application.

Another object of the present invention is to devise such a new and improved ledger card handling device which is capable of automatically positioning and precisely aligning the ledger card in the carriage of a record keeping machine on any predetermined posting line within any presettable posting zone.

A further object of the present invention is to provide such a ledger card handling device with a novel feeding means, which, in a unique manner, is capable of feeding magnetic ledger card handling media into and out of the carriage of the record keeping machine.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference characters identify like elements, and in which:

Figure 1:
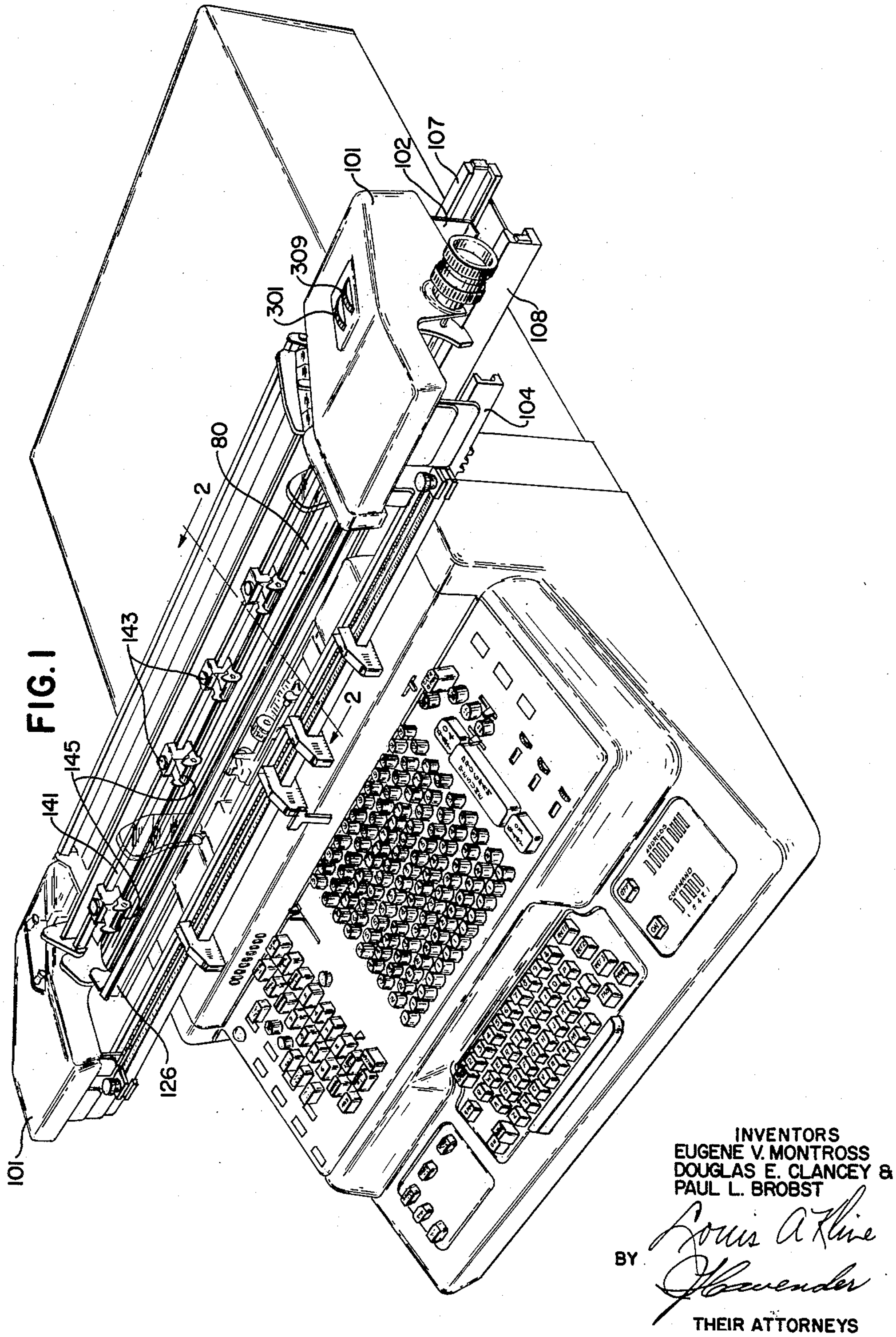
FIG. 1 is a perspective view depicting the adaptation of the novel ledger card handling device of the present invention to a record keeping machine of the type disclosed in the before-referred-to copending application.
Figures 3, 4, 5:
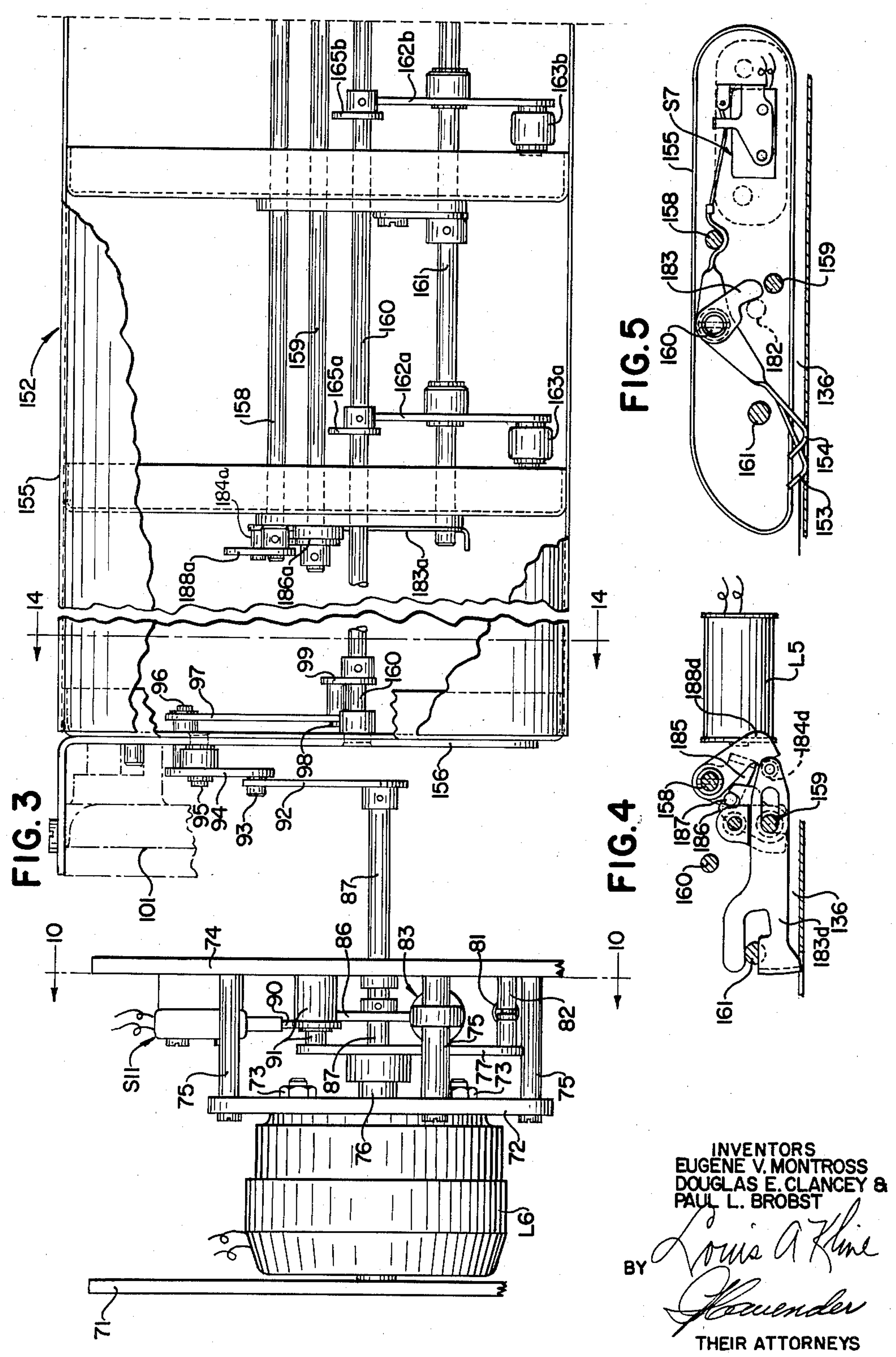
FIG. 3 is a plan view, partly in section, of the left-hand section of the camber and actuating portion of the card handling device shown generally in FIG. 2.
FIGS. 4 and 5 are fragmentary views of certain operating mechanisms utilized by the camber unit.
Figure 6:
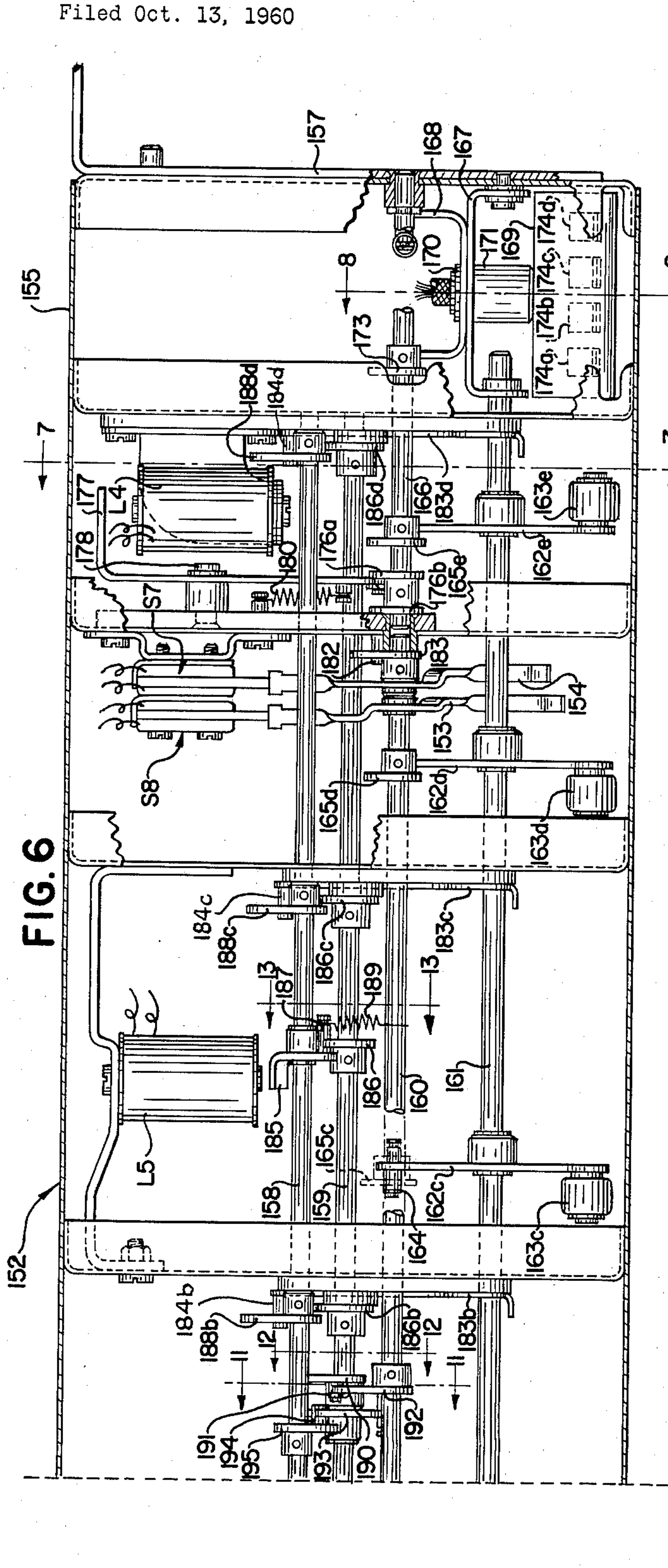
FIG. 6 is a plan view, partly in section, of the right-hand section of the camber unit shown in FIG. 2, and, when combined with FIG. 3, forms a plan view, partly in section, of the entire camber unit.
Figure 8:
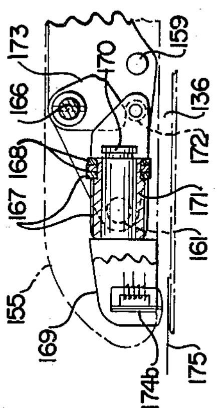
Figure 7:
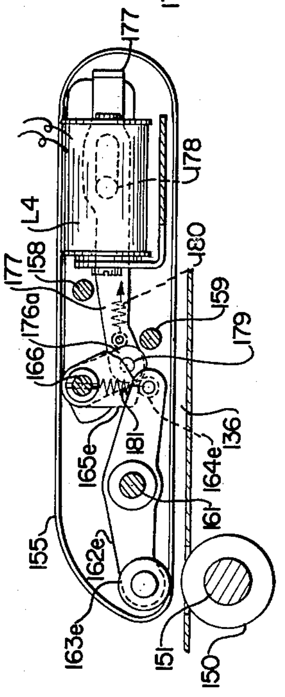
Figure 9:
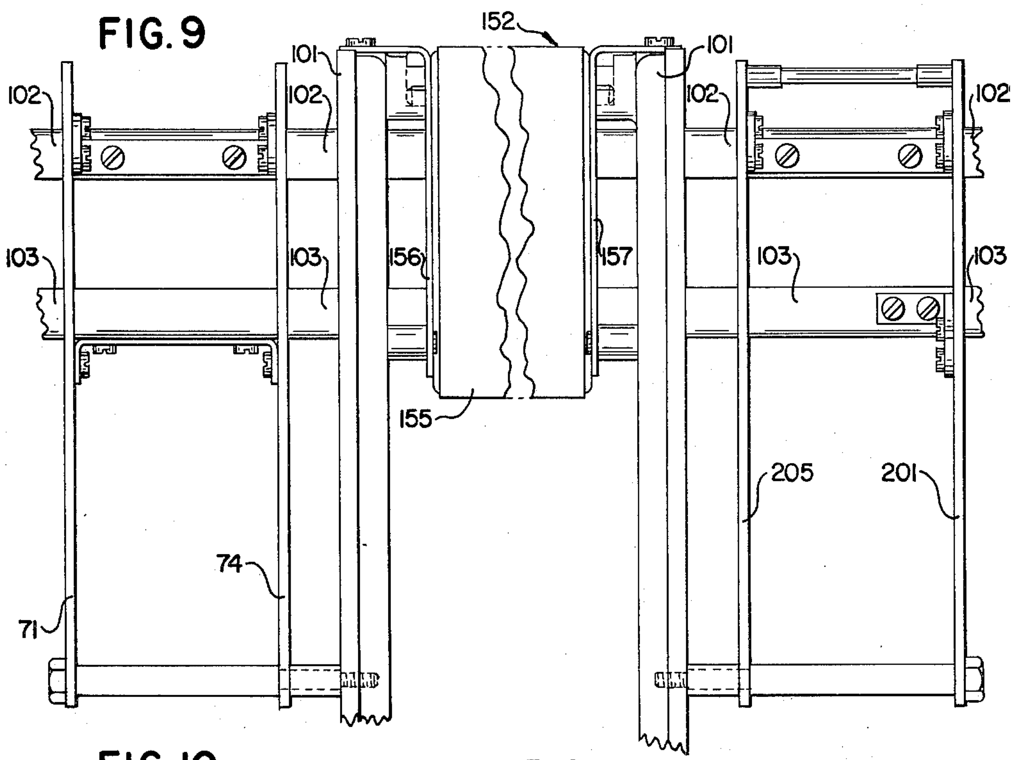
Figures 15, 16, 17, 18, 19:
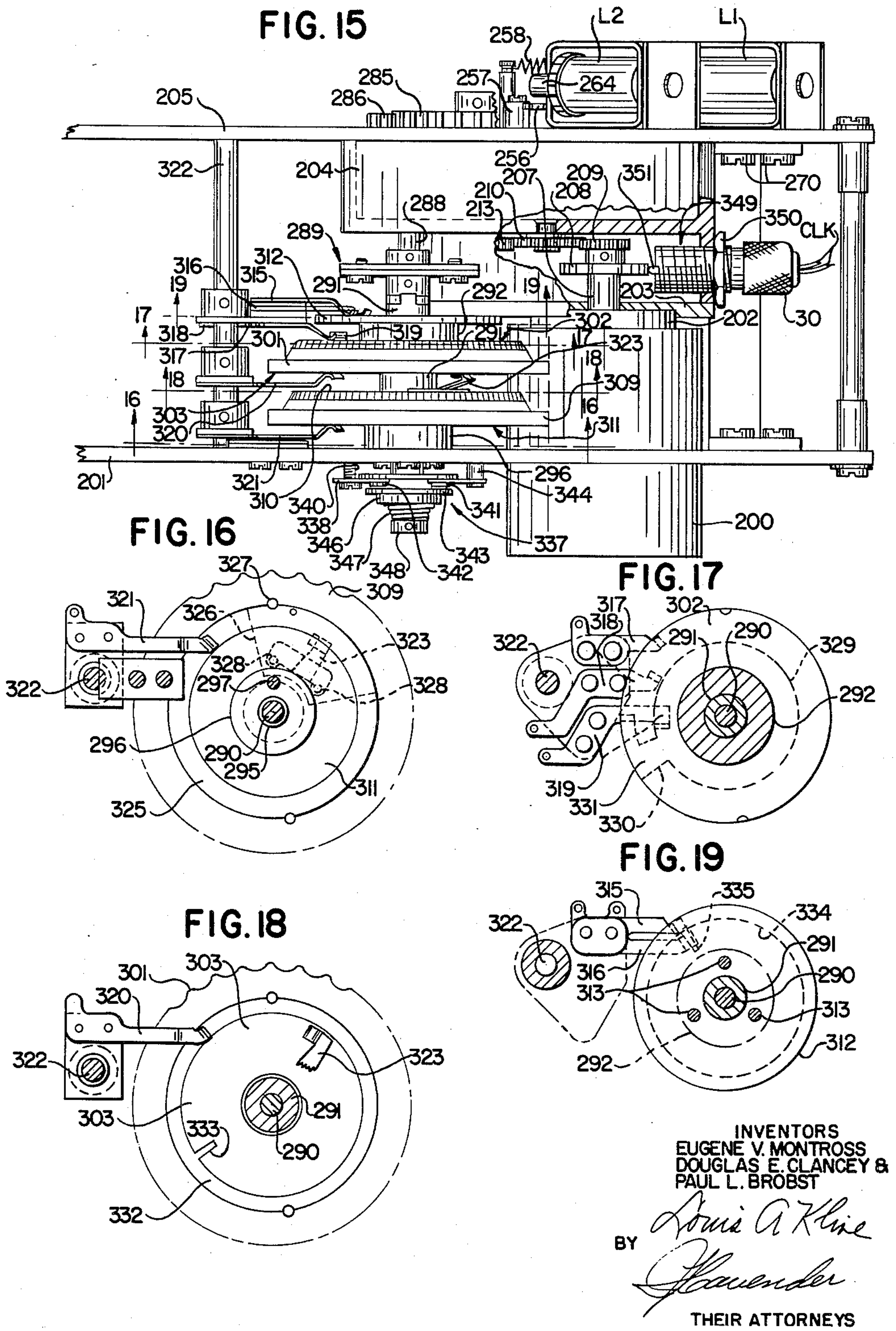
Figure 20:
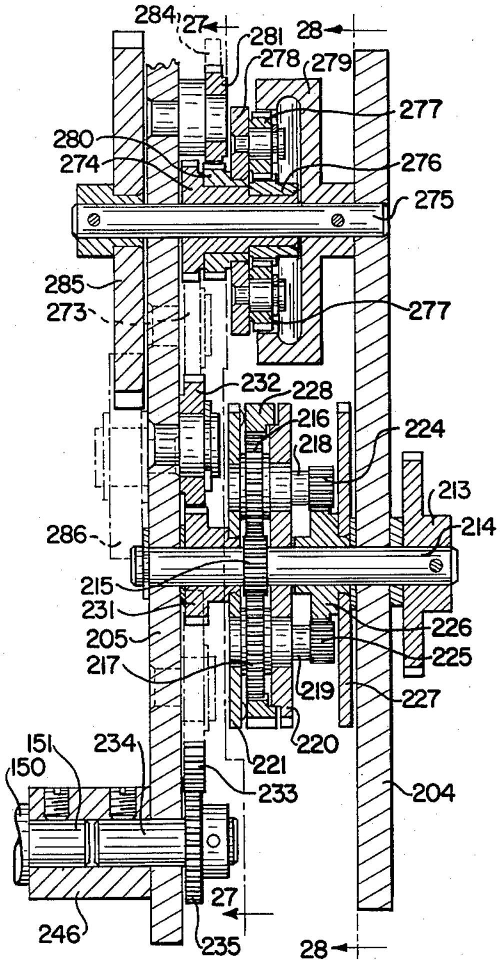
Figure 21:
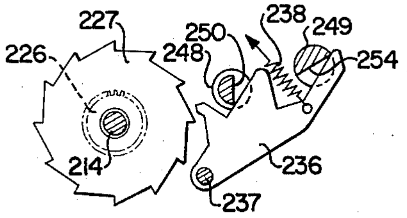
Figure 26:
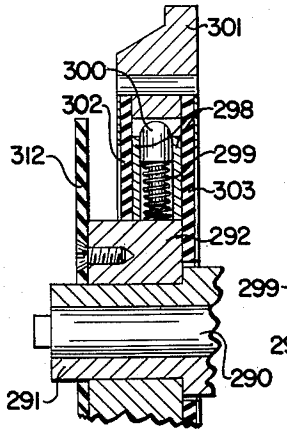
Figure 25:
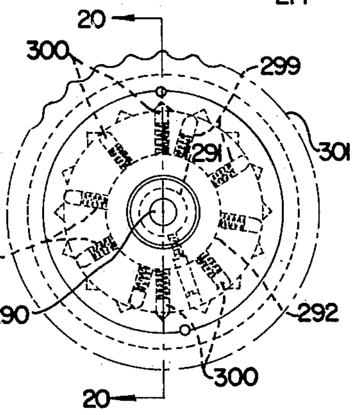
Figure 27:
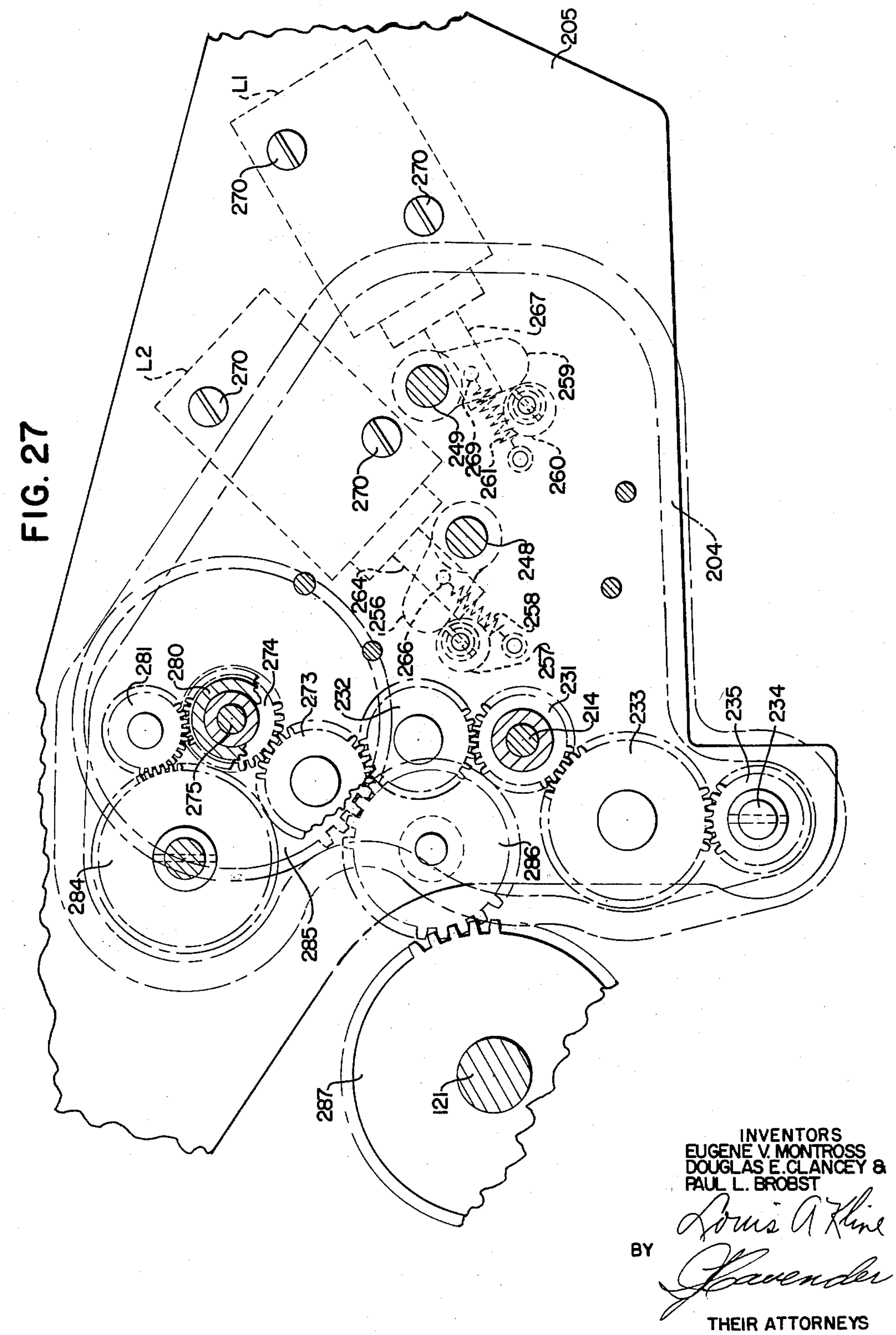
Figures 28, 29, 30, 31:
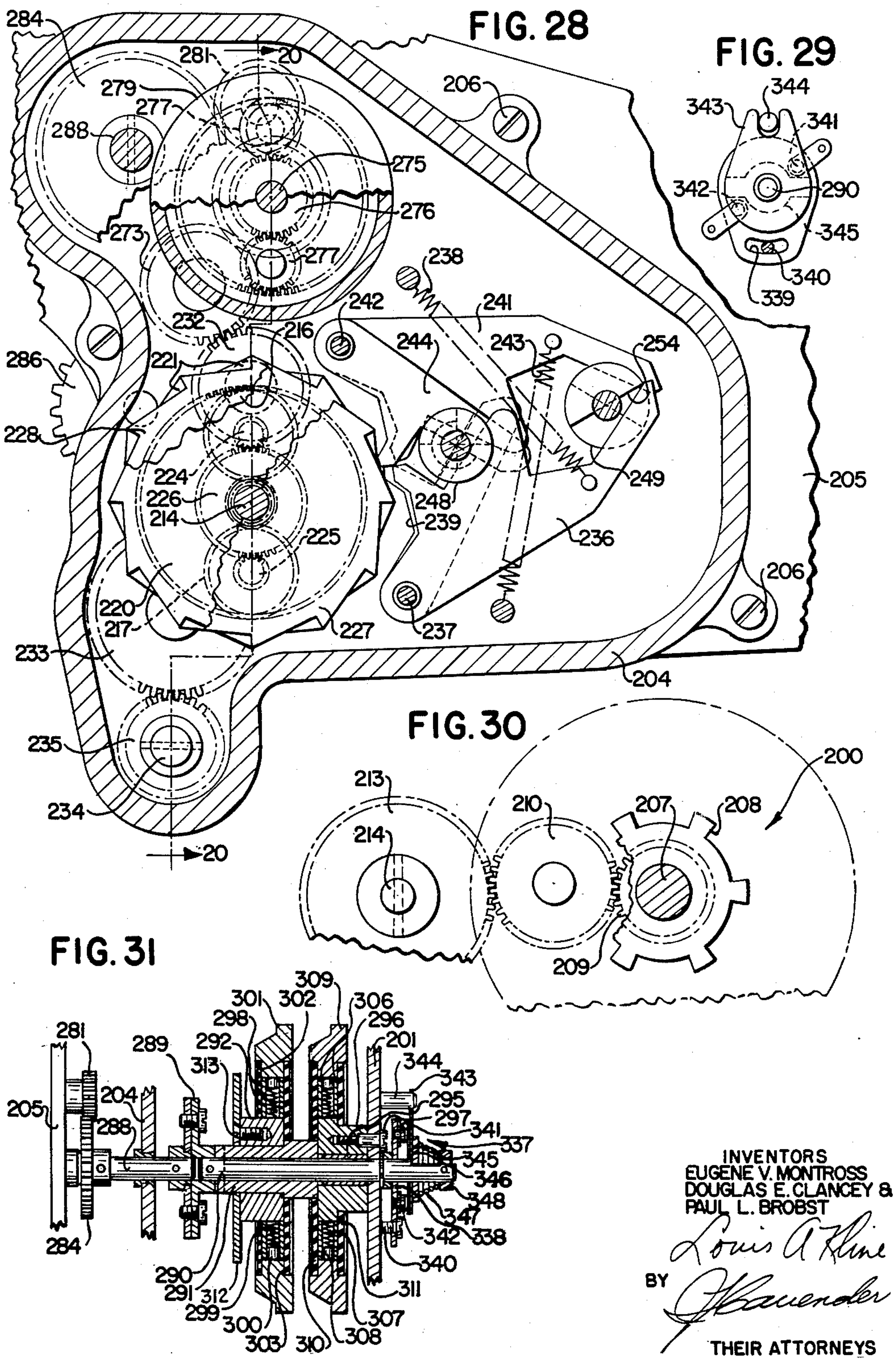
Figure 32:
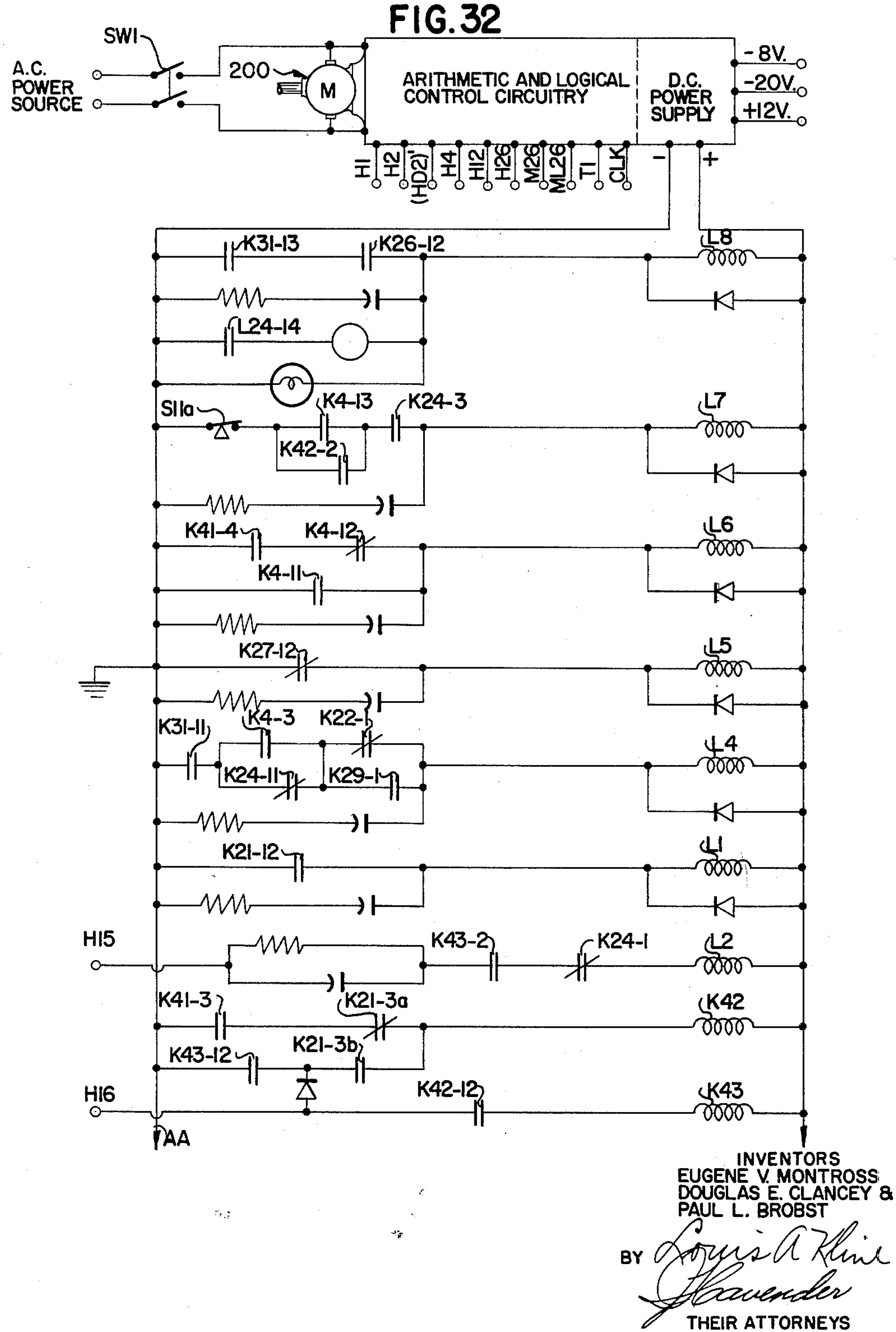
Figure 34:
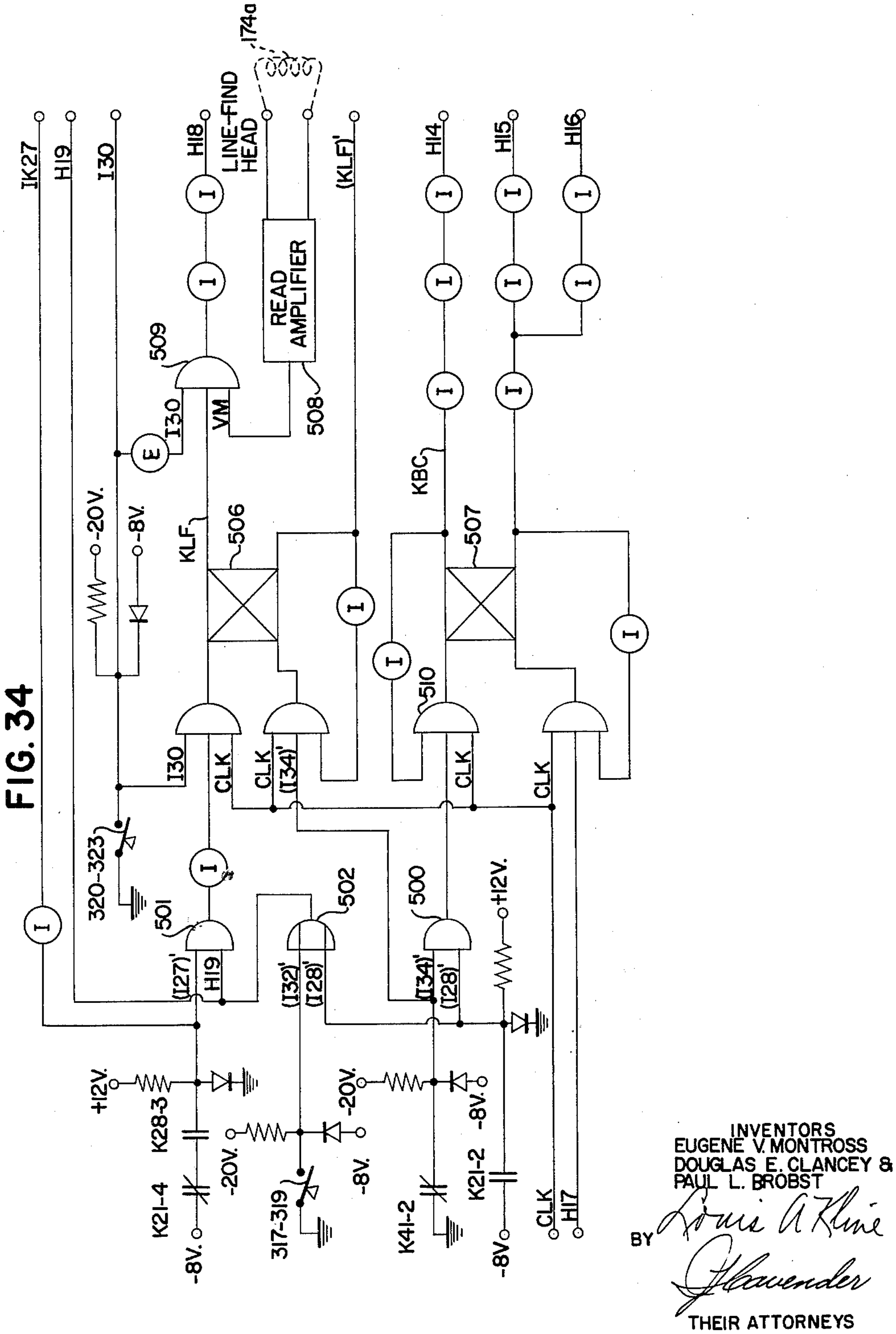
Figure 35:
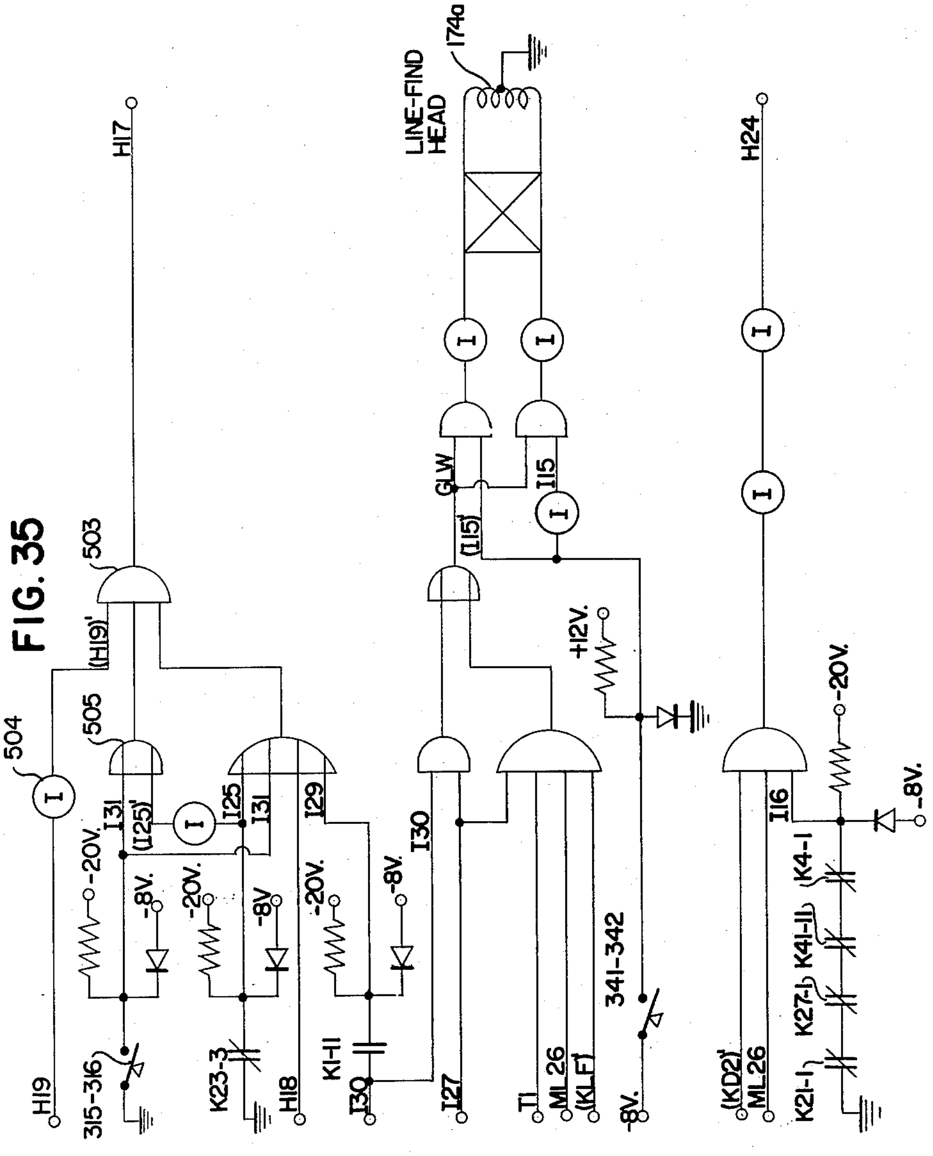
Figure 36:
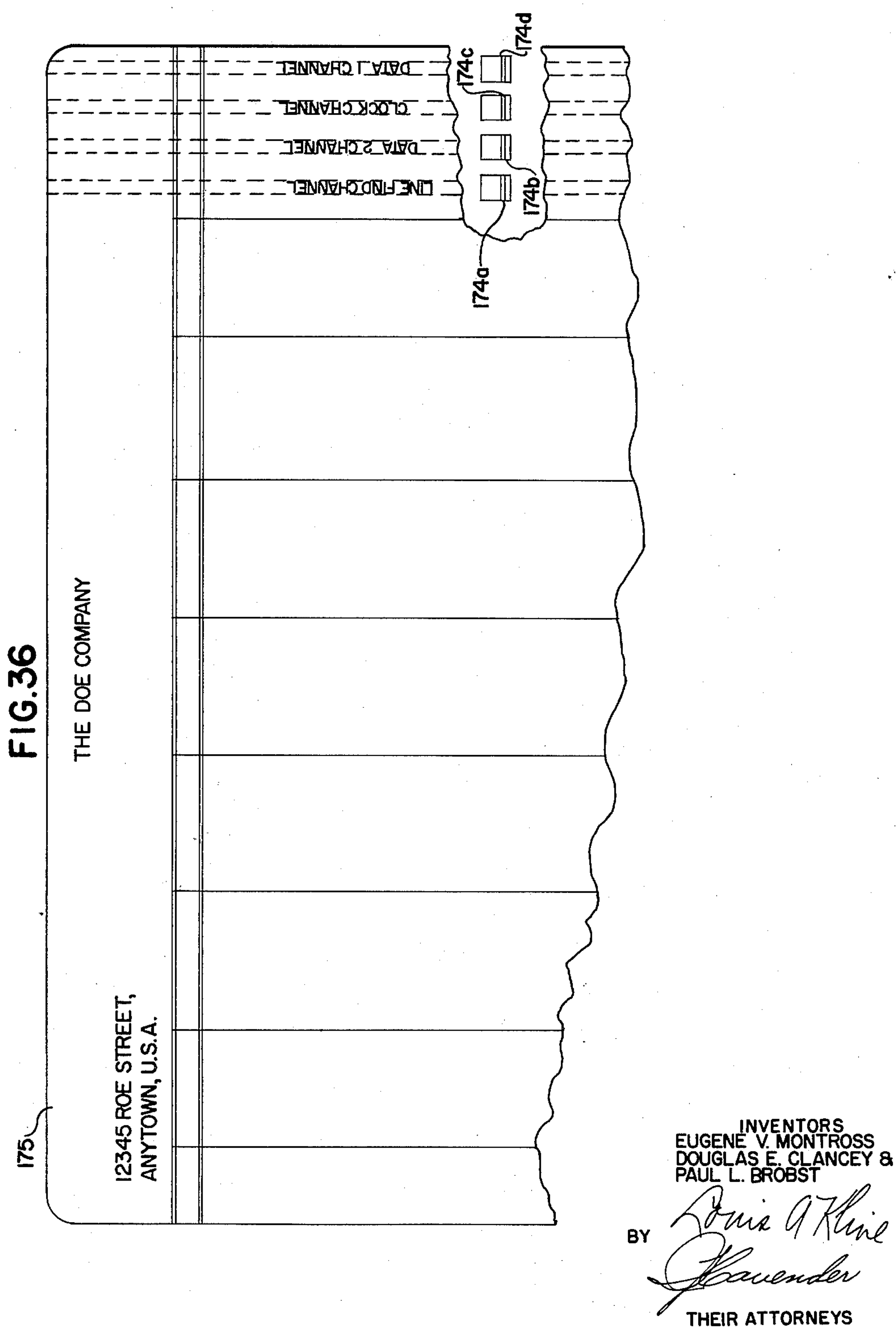

FIGS. 7 and 8 are fragmentary views of various mechanisms utilized in the camber unit, taken generally along lines 7—7 and 8—8 of FIG. 6, respectively;

FIG. 9 is a partial plan view illustrating the relationship of the camber unit with respect to the rear framework of the record keeping machine shown in FIG. 1;

FIGS. 10 through 14 are fragmentary views of various mechanisms within the camber unit, respectively taken generally along lines 10—10 through 14—14 of FIGS. 3 and 6;

FIG. 15 is a plan view, partly in section, illustrating the novel driving mechanism and mechanical line-finding portion of the ledger card handling device;

FIGS. 16 through 19 are fragmentary views of certain switching mechanisms utilized by the mechanical line-finding mechanism, respectively taken generally along lines 16—16 through 19—19 of FIG. 15;

FIG. 20 is a cross-sectional view of the unique ledger card driving mechanism illustrated generally in FIG. 15, taken generally along line 20—20 of FIG. 28;

FIGS. 21 through 24 are fragmentary views of certain operating mechanisms utilized by the ledger card driving mechanisms shown in FIG. 20;

FIGS. 25 and 26 are fragmentary views of certain mechanisms utilized by the mechanical line-finding mechanism;

FIG. 27 is a cross-sectional view of the ledger card driving mechanism taken generally along line 27—27 of FIG. 20;

FIG. 28 is a cross-sectional view of the ledger card driving mechanism taken generally along line 28—28 of FIG. 20;

FIG. 29 is a fragmentary view of a portion of the mechanical line-finding mechanism taken generally along line 29—29 of FIG. 31;

FIG. 30 is a fragmentary cross-sectional view showing a portion of the clocking mechanism utilized by the mechanical line-finding mechanism;

FIG. 31 is a cross-sectional view of a portion of the mechanical line-finding mechanism shown in FIG. 15;

FIGS. 32 through 35, when combined, constitute a schematic diagram of the electrical control circuitry utilized for controlling the various functions of the ledger card handling mechanism, as dictated by the program stored within the computer; and FIG. 36 is a fragmentary view showing a portion of the magnetic ledger card and its relationship with respect to the magnetic recording reproducing heads.

With reference to FIG. 1, there is illustrated therein a perspective view of a record-keeping machine which incorporates the features of the present invention and which is adaptable to be utilized as an input-output device for an electronic digital computing machine in the same manner as shown and described in copending application for United States Letters Patent, Serial No. 859,598, filed December 15, 1959, by Patrick B. Close et al. and assigned to the present assignee. As mentioned in the just-referred-to copending patent application, due to the fact that the record-keeping machine illustrated in FIG. 1 is of the same general type as that shown and described in United States Letters Patent No. 2,626,749, issued January 27, 1953, to Raymond A. Christian et al., a detailed description of each of the multitude of variously inner-connected mechanisms contained therein is not deemed necessary in order to obtain a full and complete understanding and appreciation of the present invention. However, a brief general description will be given of the record-keeping machine in order that the adaptation and modifications thereto in accordance with the teachings of the present invention may be more fully understood and appreciated.

As shown in FIG. 1, the record-keeping machine includes an electric typewriter keyboard located at the front end of the machine, while just behind and somewhat above this keyboard is an amount keyboard on which may be set up the various amounts which are to be entered into the totalizers of the machine and/or into the computer memory. To the left of the amount keyboard is a control keyboard containing the various function control keys, while to the right are located a plurality of motor bars and carriage control keys. In the center, just above the amount keyboard, are a group of type sectors, while just to the left of these sectors is located a type basket for the electric typewriter. Immediately behind the printing mechanism is a rotatable platen by means of which ledger cards and/or other record material may be supported, this platen being mounted on a traveling carriage which is movable back and forth across the machine. Behind the carriage is that part of the machine which houses the add-subtract totalizers, while at the front of the machine, just to the left of the typewriter keyboard, are control means for controlling a continuously-running electric motor, which drives the various operating mechanisms of the machine.

Figure 2:
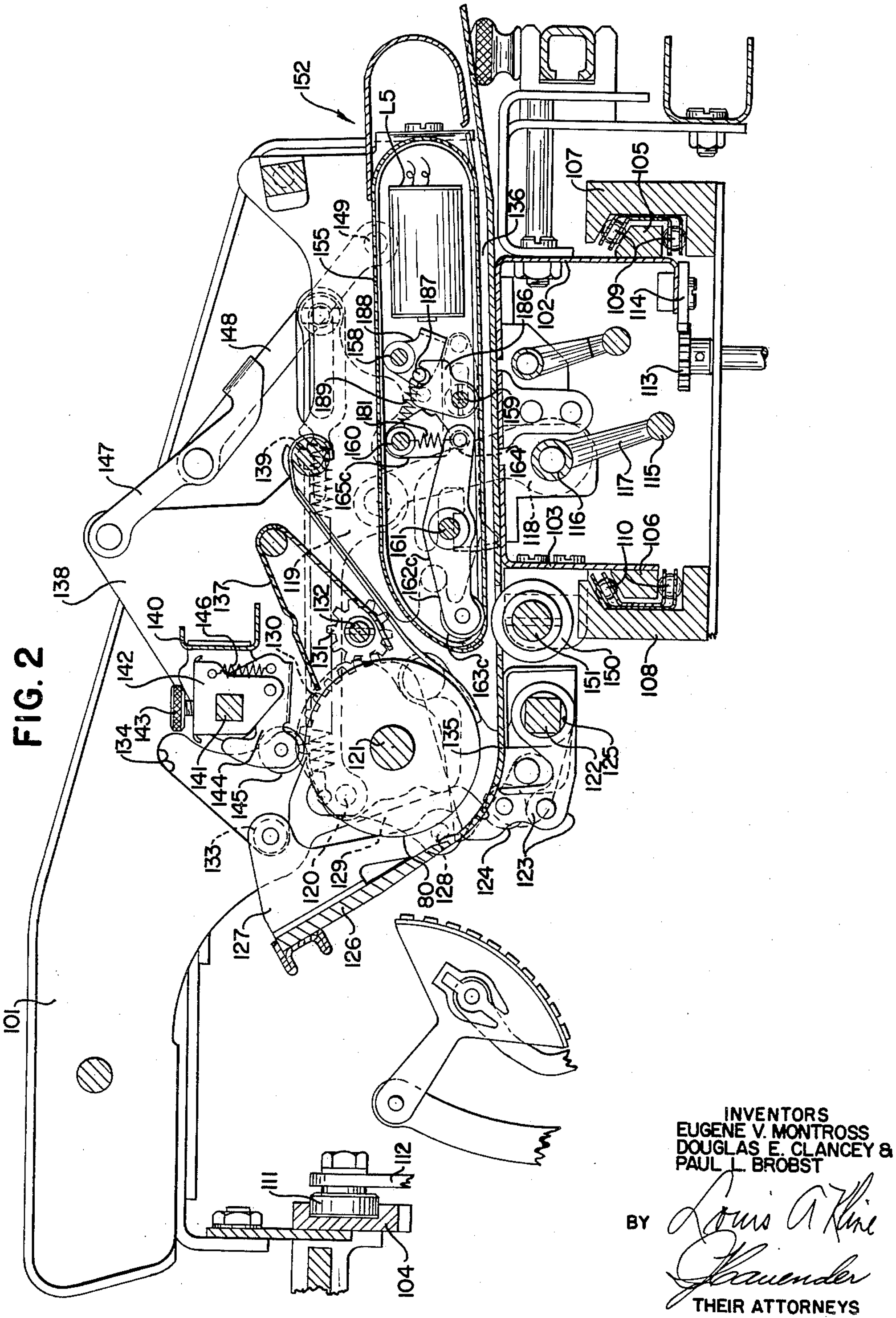
FIG. 2 is a partial cross-sectional view of the ledger card handling device taken generally along the line 2—2 of FIG. 1.

As more clearly shown in FIG. 2, the traveling paper carriage for the machine consists of a framework which includes a pair of end housings 101, only one of which is shown, which are secured to and supported in a spaced and parallel relationship with respect to each other by means of a C-shaped cross-bar 102, an L-shaped cross-bar 103, and a C-shaped carriage rack rail 104. The thus-constituted carriage frame is supported for transverse sliding movement on the machine frame by means of a pair of longitudinally extending rails 105 and 106, which are respectively secured to the cross-bars 102 and 103. Each of the rails 105 and 106 extends into a substantially C-shaped groove respectively formed in each of a second pair of rails 107 and 108, which are each fixedly secured to the machine frame by suitable means, not shown. As shown, the inner rails 105 and 106 are adapted for transverse sliding movement within the grooves formed in the outer rails 107 and 108 by means of suitable ball bearings 109 and 110, which are respectively interposed between each pair of inner and outer rails. The forward portion of the carriage is supported by means of ball-bearing rollers 111, which are received within a groove formed in the carriage rack rail 104. The rollers 111, in addition to being rotatably supported by a vertically disposed frame plate, not shown, are also rotatably supported on a front side plate 112. The machine carriage is yieldably driven in either direction by a fluid driving means, not shown, whch is operatively connected to a driving gear 113, which, in turn, engages a carriage-drive pinion rack 114, fixedly secured to the lowermost side of the cross-bar 102. A longitudinally extending rail 115 is secured to a tube-like member 116 by means of a series of pillars 117 extending therebetween. The tube 116 is journaled at either end in the end housings 101 and has a pair of carriage throat operating arms 118 secured at either end thereof, just within the end housings 101, which are pivotally connected at their upper ends to a link 119.

While in the present drawing only the front feed mechanism located at the left-hand side of the carriage is shown, it is to be understood that a similar mechanism is employed on the right-hand side of the carriage for simultaneously operating the substantially identical mechanism located on the right-hand side. Accordingly, the following description will be concerned only with the left-hand mechanism, it being understood that the right-hand mechanism is identical therewith.

The forward end of the link 119 is pivoted on a stud 120, which is secured to a cam disc, not shown, journaled on a platen shaft 121. A square shaft 122 is journaled at either end of the carriage in the end housings 101 and has mounted thereon a plurality of compression roll yokes 123, pivotally supporting a plurality of compression rollers 124. The rollers 124 are formed of rubber or other suitable material and are adapted to be resiliently urged into engagement with the surface of a platen 80 when the throat mechanism is subsequently in a closed position. As shown, the compression roll yokes 123 are loosely journaled on the square shaft 122 by means of circular holes 125 formed therein. Consequently, when the carriage throat mechanism is caused to open by movement of the rail 115 toward the rear of the machine to the position shown, the link 119 is caused to be shifted toward the rear of the machine. As a result, the previously-referred-to plate cam, not shown, is caused to be rotated clockwise, so that the square shaft 122 is rocked counter-clockwise, thereby removing the biasing yokes 123 away from the platen 80 and thus causing the compression rollers 124 to be moved out of engagement with the platen 80, all of which is fully described and set forth in the previously-referred-to United States Patent No. 2,626,749.

At the same time that the compression rollers are moved out of engagement with the platen, a front feed chute 126, which may be of any suitable transparent material, is lowered into the position shown, to thereby complete the opening of the front feed throat mechanism. The chute 126 is provided near its lower edge with a pair of longitudinally extending grooves, not shown, within which may be deposited a suitably colored pigment, so as to provide sharply defined lines for indicating the posting line of the machine. The chute 126 is secured at either end thereof, by means of screws or other suitable fastening means, to a bracket 127, which is pinned at 128 to a sector 129 journaled on the platen shaft 121. The sector 129 is provided with gear teeth 130, which mesh with the corresponding gear teeth of a spur gear 131 secured to a shaft 132, which extends across the carriage and is journaled at either end in the end housings 101. Thus the sectors located at either end of the platen 80 are constrained to rotate in unison and thereby insure parallel motion of the chute 126 as it moves from open position to closed position, and vice versa. As shown, a roller 133 is provided on the bracket 127 and cooperates with a slot 134 provided in the end housing 101, to limit and guide the motion of the chute 126. After the carriage throat is in an open position, as shown, a magnetic ledger card of the type illustrated as 175 in FIG. 36, and/or other suitable pieces of record material, is thereafter permitted to be fed into the carriage down and around the front side of the platen 80, after which time the carriage throat mechanism is caused to be closed so as to securely clamp the card in position for the next posting operation. It will thus be seen that, when the carriage throat is opened, a ledger card is thereafter permitted to be guided around the lowermost side of the platen 80 by means of the relationships between the front feed chute 126, the compression rollers 124, and a guide plate 135, which is fixedly secured to the cross-bars 102 and 103 by suitable means, not shown, the ledger card thereafter being guided into a paper guide channel 136.

Most accounting systems require the use of a journal sheet which provides a running record of every transaction recorded by the machine during an entire posting operation. Since the journal sheet is to retain a record of the entire posting operation, it is generally the first piece of record material to be placed around the platen and is usually held in position thereon by means of compression rollers which are not affected by the front feed mechanism of the machine. To accomplish this, the journal sheet, not shown, is led around the platen 80 on either side of a V-shaped paper guide 137, which extends across the carriage between the end housings 101. A pair of end plates 138, disposed at either end of the platen 80, are pivotally mounted on a stud 139 and are connected together by means of an angle bar 140 and a square shaft 141, on which are slidably mounted a plurality of compression roller brackets 142. The brackets 142 are adapted to be manually positioned along the shaft 141 and secured in any position by means of thumb screws 143. In each of the brackets 142 is pivotally supported a yoke 144, which carries a compression roller 145 adapted to bear against the topmost surface of the platen 80 when the operating mechanism is in a closed position, as shown. With the operating mechanism in this position, the compression rollers 145 are each resiliently urged into engagement with the platen 80 by means of a tension spring 146, which is stretched between the bracket 142 and the top of the yoke 144. The end plates 138 are adapted to be manually rocked about the studs 139 by means of a toggle lever arrangement which includes a thumb lever 147, to which is pivotally connected one end of a link 148, the other end of the link 148 being pivotally connected to a stud 149. Thus, when the thumb lever 147 and the link 148 are in the position shown, the compression rollers 145 are maintained in engagement with the platen 80. However, when the rightmost end of the toggle 147 is manually lifted upwardly, the end plates 138 are caused to be rocked clockwise about the studs 139, and, as a result, the compression rollers 145 are caused to be disengaged from the platen 80, thus releasing the journal sheet held therebetween. Thereafter, the journal sheet is permitted to be removed from the machine and a new one placed therein, after which the thumb lever 147 is manually pressed downwardly, thus rocking the plates 138 counter-clockwise to cause the compression rollers 145 to secure the new journal sheet in position on the platen 80.

Means have been provided to automatically effect insertion of a magnetic ledger card of the type illustrated in FIG. 36 into the carriage of the machine and to automatically position the card precisely on the next designated posting line. Such means includes a longitudinally disposed auxiliary platen 150, which is composed of a suitable resilient material and is affixed to a shaft 151, journaled in the end housings 101. A card-controlling mechanism, indicated generally as 152, is horizontally mounted between the end housings 101 and is adapted to operatively cooperate with the auxiliary platen 150. As shown in FIG. 9, the card-controlling mechanism 152 cmprises a housing member 155 fixedly secured to end brackets 156 and 157, which, in turn, are bolted to the end housings 101. With reference now to the plan view of the card-controlling mechanism shown in combined FIGS. 3 and 6, four shafts 158 through 161 are journaled in the vertically disposed rib sections of the housing member 155, and each is disposed substantially parallel with respect to the others. A plurality of rocker arms **162*a* through 162*e* are rotatably mounted on the shaft 161, with each rotatably supporting on its forward end a respective one of auxiliary compression rollers 163*a* through 163*e*. The opposite end of each of the rocker arms 162*a* through 162*e* rotatably supports a second roller, indicated generally by the reference numeral 164*e* in FIG. 7, which is adapted to cooperate with a respective one of plate cams 165*a* through 165*e*, all of which, with the exception of the plate cam 165*e*, are pinned to the shaft 160. For reasons to become more apparent hereinafter, the plate cam 165*e* is pinned to a shaft 166, which is journaled in the vertical rib sections of the housing member 155 in axial alignment with the shaft 160**.

With additional reference to the fragmentary view of FIG. 8, a substantially C-shaped bracket 167 is rotatably supported on the rightmost end of the shaft 161 and the end bracket of the housing member 155. A second substantially C-shaped bracket 168 is welded or otherwise fixedly secured to the back side of the bracket 167. A magnetic pick-up head assembly 169 is supported by the brackets 167 and 168 by means of a screw 170 extending through a tubular member 171 and threaded in the back side of the assembly 169. One leg of the bracket 168 rotatably supports a roller 172, which is adapted to cooperate with a plate cam 173 pinned to the shaft 166. As illustrated in the plan view of FIG. 6, the magnetic pick-up head assembly 169 includes four substantially identical pick-up heads **174*a* through 174*d*, which are disposed in an equally-spaced side-by-side relationship, with the air gaps thereof in alignment with the other. Each of the pick-up heads is of the variable reluctance type as currently manufactured by Electro-Products Laboratories, Incorporated, as Model 3015–A. Consequently, as the construction and mode of operation of the pick-up heads are well known to those skilled in the art, a further detailed description thereof is not deemed necessary. Suffice it to say, however, that, as illustrated in FIG. 36, the pick-up heads 174*b* and 174*d* are utilized to magnetically record and reproduce data in the two data channels of the ledger card, the pick-up head 174*c* is utilized to magnetically record and reproduce synchronizing clock information in the clock channel of the ledger card, and the pick-up head 174*a* is utilized to magnetically record and reproduce line-find data in the line-find channel, all in substantially the same manner as described in detail in the previously-referred-to copending United States patent application, Serial No. 859,598, of Patrick B. Close et al. It is to be noted that, with the plate cam 173 in the position shown in FIG. 8, all of the pick-up heads are maintained in a raised position with respect to the ledger card diagrammatically illustrated by the reference numeral 175. However, when the shaft 166** is subsequently rotated clockwise, as viewed, the pick-up heads are simultaneously lowered into operative engagement with respect ones of the magnetic strips disposed on the margin of the ledger card.

As illustrated in FIGS. 6 and 7, fixedly secured to the shaft 166, adjacent the plate cam **165*e*, is a pair of plate members 176*a* and 176*b*, which are rotatably connected to one end of an elongated member 177 by means of a pin 179. The member 177, in turn, is supported for transverse sliding movement by means of a pin 178, riding in an elongated slot formed in the member 177, and is spring-biased to the right, as viewed in FIG. 7, by means of a spring 180. The opposite end of the member 177 is provided with a right-angled bend, by means of which the member 177 is adapted to function as a movable armature for solenoid L4, which is secured to the rib portion of the housing member 155. With reference back to FIG. 7, when the shaft 166 is in the position shown, the plate cam 165*e* engages the roller 164*e*, carried by the rocker arm 162*e*, and thereby maintains the auxiliary drive roller 163*e* out of engagement with the auxiliary card-drive platen 150. However, when the shaft 166 is subsequently rocked clockwise, a spring 181 causes the rocker arm 162*e* to be rocked counter-clockwise until the auxiliary drive roller 163*e* is brought into engagement with the platen 150. It is also to be noted that, when the shaft 166 is thus rocked clockwise, the armature 177 is shifted to the left due to the clockwise deflection of the plates 176*a* and 176*b*. Consequently, when solenoid L4 is subsequently energized, the armature 177 is maintained in its shifted-to-the-left position, thereby preventing the shaft 166 from being returned to home position. As a result, the auxiliary drive roller 163e is held in engagement with the platen 150. However, when solenoid L4 is thereafter de-energized, the shaft 166 is permitted to be returned to home position and thereby cause the auxiliary drive roller 163e** to be restored to the position shown.

With additional reference to FIG. 5, a pin 182 is affixed to the lower end of the plate 176b and extends beneath a plate cam 183, which is fixedly secured to the end of the shaft 160. Consequently, when the shaft 160 is rotated clockwise, as viewed in FIG. 5, the plate cam 183 deflects the pin 182 to the left. As a result of the pin 182 thus being deflected to the left, the plate 176b and hence the shaft 166 are likewise rotated clockwise. Therefore, when solenoid L4 is subsequently energized, the shaft 166 remains in its rocked position even though the shaft 160 is thereafter returned to home position; however, when solenoid L4 is thereafter de-energized, the shaft 166 is also returned to home position by means of the spring 180 (FIG. 7). For purposes to become more apparent hereinafter, a pair of feeler arms 153 and 154 are rotatably mounted on the shaft 160 and respectively actuate the movable arms of switches S8 and S7, which are fixedly secured to a rib portion of the housing member 155.

As shown in FIGS. 4 and 6, a plurality of shiftable plate members 183a through 183d are provided, each having a fork formed on one end and an elongated slot formed in its opposite end. The forked end of each of the plates 183a through 183d is adapted to slidably engage the flat surface of a slot formed on the shaft 161, while its elongated slot portion is adapted to slidably engage the shaft 159, which is disposed therein. The slotted end of each of the plates 183a through 183d rotatably supports a respective one of rollers 184a through 184d, which respectively engages one of plate cams 188a through 188d, all of which are pinned to the shaft 158. With additional reference to FIG. 13, also pinned to the shaft 159 is a plate member 186, into the fork of which is disposed a pin 187 carried by a plate 185. The plate 185 is fixedly secured to the shaft 158 and is spring-urged in a clockwise direction by a spring 189 connected between the pin 187 and the shaft 160. Also pinned to the shaft 159 is an additional plate member 190 (FIG. 12) rotatably supporting a roller 191, which is adapted to engage a plate cam 192 affixed to the shaft 160. Further pinned to the shaft 159 is a plate 193 (FIG. 11) having a fork formed on one end thereof, into which is disposed a pin 194 carried by a plate 195 fixedly secured to the shaft 158. The opposite end of the plate 193 rotatably supports a roller 196, which is spring-urged into engagement with the plate cam 192 by means of a spring 197.

Figure 10:
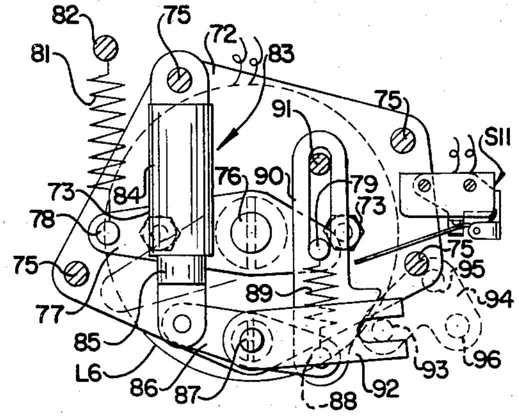
Figure 14:
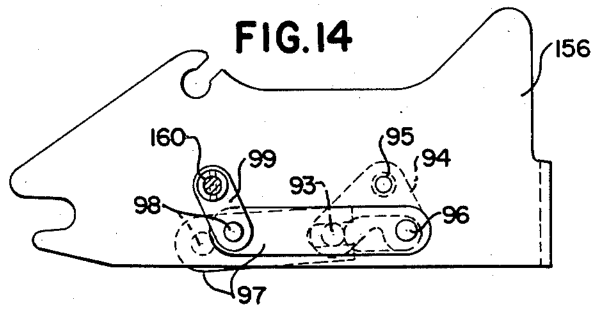

With reference to FIGS. 3, 10, and 14, a rotatably operable solenoid L6 is secured to a side frame 71 by suitable means, not shown, and is additionally secured to a bracket 72 by means of bolts 73. The bracket 72, in turn, is mounted parallel with respect to a side plate 74 by means of spacers 75 and is provided with a bore through which the shaft 76 of solenoid L6 extends. Pinned to the end of the solenoid shaft 76 is an elongated lever arm 77 having pins 78 and 79 affixed to opposite ends thereof, the lever 77 being spring-urged clockwise by means of a spring 81, connected between the pin 78 and a pin 82. A dash pot of a well-known variety, and indicated generally as 83, is mounted on a spacer 75 and consists essentially of a cylindrical housing 84 having a piston 85 slidably disposed therein. The lower end of the piston 85 is pinned to one end of an arm 86. The arm 86 is fixedly secured to a shaft 87, which is journaled in the plate 74. On the opposite end of the arm 86 is mounted a pin 88 having one end of a spring 89 connected thereto, with the remaining end of the spring 89 being connected to the pin 79. Also rotatably pinned to the rightmost end of the arm 86, by means of the pin 88, is a slotted slide member 90, which is guided for sliding movement by means of a slotted stud 91 fixedly secured to the plate 74. Pinned to the remaining end of the shaft 87 is a member 92, whose forked end engages a stud 93 carried by a plate 94, the plate 94 being rotatably supported on a stud 95 secured to the bracket 156. An elongated link 97 is rotatably pinned at one end thereof to the plate 94 by means of a second stud 96, carried by the plate 94, and is rotatably pinned at its remaining end, by means of a pin 98, to a rocker arm 99 which is fixedly secured to the shaft 160.

When solenoid L6 (FIG. 3) is subsequently caused to be energized by the computer control circuitry in accordance with a programmed sequence, in such a manner that its output shaft 76 is caused to be rocked counter-clockwise, as viewed in FIG. 10, the pin 79, mounted on the rightmost end of the lever 77, is caused to move upwardly within the elongated slot formed in the slide member 90. Due to the action of the spring 89, connected between the pins 79 and 88, the slide member 90 is urged upwardly. As the slide 90 moves upwardly, its shelf-like projection engages the movable arm of switch S11 and thereby causes its contacts to be actuated. Simultaneously therewith, the arm 86, the rightmost end of which is rotatably pinned to the lower end of the slide 90, is also rocked counter-clockwise. However, due to the well-known action of the dash pot 83, connected to the opposite end of the arm 86, the arm 86 essentially starts to move counter-clockwise after the solenoid shaft 76 has reached its extreme counter-clockwise position. This results in somewhat of a delayed action of the rotational movement of the arm 86 with respect to the rotational movement of the solenoid shaft 76. After the arm 86 has reached its extreme counter-clockwise rotational position and the slide 90 has likewise reached its extreme upwardly-deflected position, the lower portion of the elongated slot formed in the slide 90 engages the pin 79 carried by the armature of solenoid L6. Consequently, when solenoid L6 is subsequently de-energized, its armature is not returned to home position immediately thereafter, due, again, to the well-known action of the dash pot 83. However, due to the upward urgency of the spring 81, the solenoid shaft 76, the slide 90, and the arm 86 are all simultaneously and slowly returned to home position, as shown, at a speed determined by the air escapement adjustment of the dash pot 83.

Due to the fact that the arm 86 is fixedly secured to the shaft 87, and the shaft 87, in turn, is fixedly secured to the lever member 92, as more clearly illustrated in FIG. 3, the movement of the member 92 is exactly the same as the movement of the arm 86. Consequently, when solenoid L6 is energized, so that the arm 86 is slowly rocked counter-clockwise in the manner just described, the member 92 is likewise rocked slowly counter-clockwise. Due to the engagement of the forked end of the member 92 with the stud 93, the plate 94 is thereby rocked clockwise about the stud 95. As shown in FIG. 14, when the plate 94 is thus rocked clockwise, the link 97, rotatably pinned thereto by the stud 96, is shifted to the left, as viewed. As a result of the link 97 thus being shifted to the left, the rocker arm 99, rotatably pinned thereto, and the shaft 160, fixedly secured to the rocker arm 99, are both rocked clockwise. With reference back to the plan view of FIG. 3, it is therefore evident that, when solenoid L6 is energized, the shaft 160 is caused to be rocked slowly clockwise by a maximum distance of approximately sixty degrees; when solenoid L6 is subsequently de-energized, the shaft 160 is caused to be slowly returned to home position.

Figure 11:
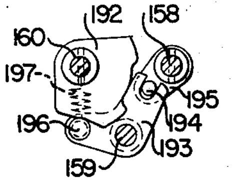

With additional reference to the fragmentary view of FIG. 11, an approximately thirty-degree clockwise rotation of the shaft 160, hereinafter called the "main cam shaft," causes the high point of the plate cam 192 to engage the stud 196 and thereby cause the plate 193 to be rocked counter-clockwise about the shaft 159. Due to the fact that the forked end of the plate 193 engages the pin 194, carried by the second plate 195, the shaft 158 is first caused to be rocked clockwise. However, continued clockwise rotation of the main cam shaft 160 causes the roller 196 to engage a subsequent low point of the plate cam 192, and, as a result, the shaft 158 is thereby rocked counter-clockwise. It is evident, therefore, that, as a result of the main cam shaft 160 being rocked clockwise, the shaft 158 is first rocked clockwise and then is rocked counter-clockwise. Upon return of the main cam shaft 160 to home position due to deenergization of solenoid L6, the rotational movement of the shaft 158 is, of course, the reverse, as just described.

Figure 12:
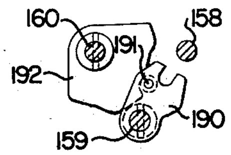

As a result of the shaft 158 first being rocked clockwise, the cams 188*a* through 188*d* (see FIG. 4) are likewise rocked clockwise, so that their lowermost ends engage a respective one of the rollers 184*a* through 184*d*, which are carried by respective ones of the plate members 183*a* through 183*d*, hereinafter called "paper guide plates." Consequently, the paper guide plates are thus shifted simultaneously to the left, to the position illustrated in FIG. 13. Thereafter, the shaft 161 is positioned in the extreme right-hand portion of the elongated slot formed in each of the paper guide plates 183*a* through 183*d*. As illustrated in FIGS. 6 and 12, a second cam plate 190 is fixedly secured to the shaft 159 and carries a roller 191, which is in engagement with the plate cam 192. Therefore, after the main cam shaft 160 has initially been rocked clockwise by a distance of approximately thirty degrees, a subsequent high portion of the cam 192 engages the roller 191 and thereby causes the shaft 159 to be rocked clockwise. It is therefore evident that the shaft 159 is rocked clockwise approximately thirty degrees after the main cam shaft 160 is rocked clockwise.

Figure 13:
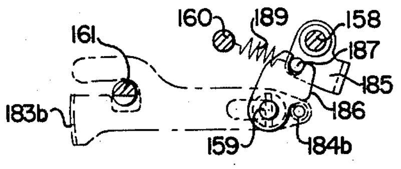

Therefore, after the main cam shaft 160 is rocked clockwise by a distance of approximately thirty degrees, during which time the paper guide plates 183*a* through 183*d* are being shifted to the left to the position illustrated in FIG. 13, the shaft 159 is rocked clockwise and thereby causes the high portions of the plate cams 186*a* through 186*d*, which are pinned thereto, to engage a respective one of the rollers 184*a* through 184*d* carried by respective ones of the paper guide plates 183*a* through 183*d*. As a result of such engagement, the leftmost ends of the paper guide plates 183*a* through 183*d* are simultaneously raised to a position determined by the shaft 161, after they are first shifted to the left in the manner just described. Simultaneously with the lifting operation of the paper guide plates, the forked end of the plate cam 186 engages the pin 187 carried by the plate 185 and thereby causes the plate 185 to be rocked counter-clockwise about the shaft 158. As illustrated in FIGS. 4 and 6, after the plate 185 is thus rocked counter-clockwise, energization of solenoid L5 maintains the plate 185 in its rocked position and thus prevents return of the shaft 159 to home position when the shaft 158 is subsequently rocked counter-clockwise in the manner just described, or is subsequently returned to home position. It is therefore evident that, as long as solenoid L5 remains energized, all of the paper guide plates are maintained in their shifted and raised position.

Driving means have been provided for effecting the automatic feeding of ledger cards into and out of the carriage of the record-keeping machine and for automatically causing the card to be precisely positioned on the next posting line. With reference to FIG. 15, such means includes an electric motor 200, whose housing extends through a substantially U-shaped slot, not shown, formed on the lower side of a bracket 201, with its front end bracket 202 fitted in a circular recess formed in a plate member 203 and fixedly secured thereto by suitable means, not shown. The plate member 203 is fixedly secured to a housing member 204 by suitable means, not shown, which, in turn, is secured to a back frame 205 by means of screws 206 threaded therein, as more clearly shown in FIG. 28. The output shaft 207 of the motor 200 projects through the plate 203 and has pinned to its end a twelve-tooth cam wheel 208 and a spur gear 209. With additional reference to FIG. 30, the spur gear 209 is in mesh with and drives an idler gear 210, which is rotatably supported by the rib portion of the housing member 204. The idler gear 210, in turn, meshes with and drives a spur gear 213, which, as viewed in FIG. 20, is pinned to the rightmost end of a shaft 214, the shaft 214 being journaled at either end thereof in the back frame 205 and the rib portion of the housing member 204. The ratios of the numbers of teeth of the gears 209, 210, and 213 are properly chosen so that the motor 200, when energized, rotates the shaft 214 at a constant speed of approximately 1,800 r.p.m. in a clockwise direction as viewed from the right in FIG. 20.

Figure 22:
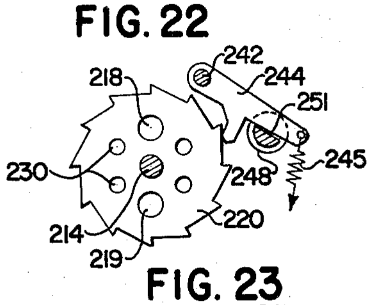
Figure 24:
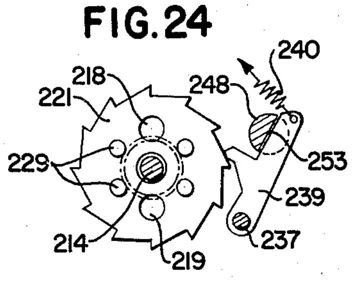

A sun gear 215 (FIG. 20) is formed on the shaft 214 and meshes with a pair of diametrically opposite planet gears 216 and 217, each of which is a part of a different planet gear cluster whose shafts 218 and 219, respectively, are each journaled at substantially either end thereof in both of aligner plates 220 and 221, as additionally illustrated in FIGS. 22 and 24. Formed on the rightmost end of each of the shafts 218 and 219 is a second planet gear 224 and 225, respectively, each in mesh with a second sun gear 226, which is freely mounted on the shaft 214 and is additionally fixedly secured to a third aligner plate 227.

Figure 23:
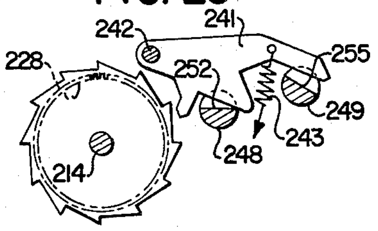

Also in mesh with both of the planet gears 216 and 217 is a ring gear 228, which has a circular recess formed in its rightmost face, as viewed, into which is rotatably fitted a corresponding circular raised portion formed on the leftmost face of aligner plate 220. As shown in FIG. 23, the ring gear 228 has, formed along its outermost periphery, a plurality of teeth corresponding in number and configuration to those of the aligner plate 220 of FIG. 22. With additional reference to FIGS. 22 and 24, the aligner plate 221 is provided with a plurality of studs 229, which are press fitted into corresponding holes 230 formed in the aligner plate 220, and thereby insures exact alignment and unitary rotation of the aligner plates 220 and 221. The aligner plate 221, additionally, is fixedly secured to a spur gear 231, which is freely mounted on the shaft 214 in mesh with a pair of idler gears 232 and 233, as more clearly shown in FIG. 27, each of which is rotatably secured to the back frame 205. As shown in FIG. 20, an output shaft 234 is journaled at one end in the back frame 205 and has pinned to its rightmost end, as viewed, a spur gear 235 in mesh with the idler gear 233, as more clearly shown in FIGS. 27 and 28. The opposite end of the output shaft 234 is connected to the shaft 151 of the auxiliary drive plate 150 by means of a coupling member 246.

With reference now to the detailed views in FIGS. 21 through 24, in addition to the assembly view in FIG. 28, a first pawl 236 is pivotally mounted on a stud 237, which is fixedly secured to the back frame 205 and is spring-urged counter-clockwise, as viewed, toward engagement with the aligner plate 227 by a spring 238; a second pawl 239 is also pivotally mounted on the stud 237 and is spring-urged counter-clockwise toward engagement with the aligner plate 221 by means of a spring 240; a third pawl 241 is pivotally mounted on a stud 242, which also is fixedly secured to the back frame 205 and is spring-urged clockwise toward engagement with the ring gear 228 by a spring 243; and a fourth pawl 244 is also pivotally mounted on the stud 242 and is spring-urged clockwise toward engagement with the aligner plate 220 by a spring 245.

A pair of parallel cam shafts 248 and 249 extend between and are each journaled in the back frame 205 and the rib portion of the housing member 204. The cam shaft 248 is provided with four flat cam surfaces 250 through 253, respectively cooperating with the pawls 236, 244, 241, and 239, whereas the cam shaft 249 is provided with two flat cam surfaces 254 and 255, which respectively cooperate with the pawls 236 and 241. With reference now to FIG. 27, affixed to an extension of the cam shaft 248 is a lever 256, which is spring-urged counter-clockwise against a stop 257 by a spring 258. Likewise, affixed to an extension of the cam shaft 249 is a lever 259, which is spring-urged clockwise against a stop 260 by the action of a spring 261. The lever 256 is pivotally connected to the armature 264 of an electrically energizable solenoid L2 by means of a pin 266. Also, the lever 259 is pivotally connected to the armature 267 of an electrically energizable solenoid L1 by means of a pin 269. As more clearly shown in FIG. 15, the solenoids L1 and L2 are each connected on the side of the back frame 205 by means of screws 270 threaded therein.

The functions and modes of operation of the cam shafts 248 and 249, in conjunction with their associated mechanisms, will now be described in detail. It is first assumed that the solenoids L1 and L2 (FIG. 27) are both de-energized, so that the levers 256 and 259 are respectively held in engagement with the stops 257 and 260 by the springs 258 and 261, as shown. Consequently, the cam surfaces 250 through 253 of the cam shaft 248 and the cam surfaces 254 and 255 of the cam shaft 249 are each rotatably oriented with respect to the pawls 236 and 239, as illustrated in FIGS. 21 through 24. As a result, the pawls 236 and 241 are held out of engagement with the aligner plate 227 and the ring gear 228, respectively. The cam surfaces 251 and 253 of the cam shaft 248, however, allow the pawls 244 and 239 to be respectively rocked into engagement with the aligner plates 220 and 221 by the springs 245 and 240. Due to the fact that the aligner plates 220 and 221 are pinned together, both counter-clockwise and clockwise rotations thereof are prevented by the combined actions of the pawls 244 and 239; however, the aligner plate 227 and the ring gear 228 are both free to be rotated in either direction about the shaft 214.

It is also assumed that the motor 200 (FIG. 15) is energized and that the gear 213 is rotated thereby at a substantially constant speed of approximately 1,800 r.p.m. in a clockwise direction as viewed from the right side of FIG. 20, all in the same manner as previously described. As it has been assumed that both of the solenoids L1 and L2 are de-energized, so that the aligner plates 220 and 221 are locked against any rotational movement and the aligner plate 227 and the ring gear 228 are both free to be rotated about the shaft 214, clockwise rotation of the sun gear 215 causes the planet gears 216 and 217, and hence the planet gears 224 and 225, to be rotated counter-clockwise at a speed of approximately 900 r.p.m. As a result, the ring gear 228 is rotated counter-clockwise thereby at a speed of approximately 251 r.p.m. and aligner plate 227 is rotated clockwise. Thus it is evident that, as long as the aligner plate 221 is locked against any rotational movement thereof, the output shaft 234 and hence the auxiliary platen 150 are likewise locked against any rotational movement. As before stated, the aligner plate 221 remains locked as long as solenoids L1 and L2 remain de-energized.

If it is next assumed that solenoid L2 (FIG. 27) is selectively energized and solenoid L1 remains de-energized, the armature 264 is drawn inwardly of the solenoid housing, so that the lever 256 and hence the cam shaft 248 are both deflected clockwise, as viewed, by an angular distance of approximately thirty degrees. With reference now to FIGS. 21 through 24, when the cam shaft 248 is thus rocked thirty degrees clockwise, the aligner plate 227 remains free to be rotated; the pawl 244 is rocked counter-clockwise, thus freeing the aligner plates 220 and 221 for subsequent counter-clockwise rotation; the pawl 241 is spring-urged into engagement with the ring gear 228, thus preventing subsequent counter-clockwise rotation thereof; and the pawl 239 is rocked clockwise, thus freeing the aligner plates 220 and 221 for subsequent clockwise rotation. It is therefore seen that the aligner plates 227, 220, and 221 are now permitted to be rotated in either direction, whereas the ring gear 228 is permitted to be rotated only clockwise.

With reference back to FIG. 20, it is still assumed that the sun gear 215 is being rotated clockwise at a constant speed of approximately 1,800 r.p.m. by the motor 200 (FIG. 15). It is first to be noted that it has been assumed that, prior to energization of solenoid L2 (FIG. 27), the ring gear 228 is being rotated counter-clockwise by the planet gears 216 and 217. Thus, when solenoid L2 is energized, causing the pawl 241 (FIG. 23) to immediately engage the ring gear 228 and thereby prevent further counter-clockwise rotation thereof, the planet gears 216 and 217 continue to be rotated counter-clockwise by the sun gear 215. However, as the ring gear 228 is now held stationary and as aligner plates 220 and 221 are free to rotate, the planet gears 216 and 217 are effectively caused to be translated in a clockwise orbit about the sun gear 215 due to their engagement with the internal teeth of the ring gear 228. Since the planet gears 216 and 217 have fixed locations with respect to the aligner plates 220 and 221, the aligner plates 220 and 221 (hence the spur gear 231) are rotated clockwise thereby. The teeth ratios of the spur gear 231, the idler gear 233, and the spur gear 235 are properly so chosen that the clockwise rotation of the spur gear 231 causes the output shaft 234 and hence the auxiliary platen 150 to be driven clockwise thereby at a speed of approximately 300 r.p.m.

It is now assumed that solenoids L1 and L2 (FIG. 27) were previously de-energized and are now simultaneously energized for the first time, so that the cam shaft 248 is deflected clockwise approximately thirty degrees due to the inward movement of the solenoid armature 264, and, simultaneously therewith, the cam shaft 249 is deflected counter-clockwise approximately thirty degrees due to the inward movement of the solenoid armature 267. It is again assumed that, prior to energization of solenoids L1 and L2, the sun gear 215 is still being rotated clockwise at a constant speed by the motor 200 (FIG. 15), so that the sun gear 226 and hence the aligner plate 227 are likewise being rotated clockwise by the planet gears 224 and 225, as before described.

With reference back to FIGS. 21 through 24, when solenoids L1 and L2 are subsequently energized such that cam shafts 248 and 249 are rocked approximately 30 degrees clockwise and counter-clockwise, respectively, pawl 236 is deflected counter-clockwise by spring 238 into engagement with aligner plate 227, thus bringing aligner plate 227 to a sudden standstill and preventing subsequent clockwise rotation thereof; pawl 244 is rocked counter-clockwise out of engagement with aligner plate 220, thus permitting subsequent counter-clockwise movement of aligner plates 220 and 221; pawl 241 remains out of engagement with ring gear 228; and pawl 239 is rocked clockwise out of engagement with aligner plate 221, thereby permitting subsequent clockwise rotation of aligner plates 220 and 221. With reference now to FIG. 20, as a result of aligner plates 220 and 221 being released for rotation and aligner plate 227, hence sun gear 226, being brought to a sudden standstill, planet gears 224 and 225 effectively roll around sun gear 226 in a counter-clockwise orbit due to the engagement thereof with sun gear 226. In the same manner as previously described, due to the fixed location of planet gears 224 and 225 with respect to aligner plate 221, aligner plate 221 and sun gear 231 are likewise rotated in a counter-clockwise direction about shaft 214. Consequently, auxiliary platen 150 is thereafter rotated in a counter-clockwise direction at a constant speed of approximately 300 r.p.m. by sun gear 231 driving through idler gear 233 and spur gear 235.

In summary: when both of solenoids L1 and L2 are de-energized, the aligner plates 220 and 221 are locked against rotation, thereby locking the auxiliary platen against rotation; when solenoid L2 is energized and solenoid L1 is de-energized, the ring gear 228 is locked against counter-clockwise rotation, thereby causing the auxiliary platen to be rotated clockwise at a forward speed of approximately 300 r.p.m., and, when both of solenoids L1 and L2 are energized, the aligner plate 227 is locked against clockwise rotation, thereby causing the auxiliary platen to be rotated counter-clockwise at a reversed speed of approximately 300 r.p.m.

It is evident, therefore, that solenoid L2 determines whether or not there is to be any rotation of the auxiliary platen, whereas solenoid L1 determines the direction of rotation. Consequently, by selective energization of solenoids L1 and L2, the auxiliary platen is selectively driven either clockwise or counter-clockwise, without any need whatever of reversing the direction of rotation of the driving motor. Even though the just-described differential mechanism is designed for a six-to-one speed reduction in both directions of rotation of the auxiliary platen, it is of course apparent that any desired speed reduction in either direction of rotation may readily be obtained simply by choosing the proper gearing ratios, or by utilizing friction rollers of proper diameter ratios, all in a manner well known to those skilled in the art. Additionally, such a mechanism has been found extremely fast-acting in that the auxiliary platen may selectively be reversed from full speed in one direction to full speed in the opposite direction in less than sixteen milliseconds, simply by effecting selective energization or de-energization of solenoid L1, as the case may be.

With reference to FIG. 27, the idler gear 232 is in mesh with a second idler gear 273, which, in turn, meshes with a spur gear 274; as will later be seen, the spur gear 274 constitutes one input to a second planetary differential mechanism, which will now be described in detail. As more clearly illustrated in FIG. 20, the spur gear 274 is freely mounted on a shaft 275, which extends between and is journaled at either end thereof in the housing member 204 and the back frame 205. Affixed to the rightmost end of the spur gear 274, as viewed, is a sun gear 276, which meshes with a pair of planetary gears 277 carried by a circular plate 278. Pinned to the rightmost end of the shaft 275 is a ring gear 279, which also meshes with both of the planetary gears 277. The plate 278 is fixedly secured to a planet carrier gear 280, which is freely mounted on an extension of the spur gear 274 and is in mesh with an idler gear 281, which, in turn, meshes with a spur gear 284.

To describe a mode of operation of the just-described second planetary differential mechanism, it is assumed that the accounting machine platen 80 (FIG. 2) is stationary, so that the ring gear 279 is locked against rotational movement in a manner to be fully described hereinafter. It is further assumed that a ledger card is automatically being fed, either into or out of the accounting machine carriage, so that the auxiliary platen 150 is being rotated either clockwise or counter-clockwise by the spur gear 231 in the same manner as previously described in detail with respect to FIG. 20.

As is evident from FIG. 27, any rotational movement of the spur gear 231 is transmitted through the idler gears 232 and 273 directly to the spur gear 274 and hence to the sun gear 276 (FIG. 20). With reference now to FIG. 20, as it is assumed that the ring gear 279 is locked against rotational movement, rotation of the sun gear 276 causes the planetary gears 277 to be rotated about their spindles, thus effectively causing the planetary gears to be translated in a fixed orbit about the shaft 275. The translational movement of the planetary gears 277 causes the plate 278, and hence the planet carrier gear 280, to be rotated in the same direction of the translational movement of the gears 277. As more clearly illustrated in FIG. 27, it is seen that rotational movement of the planet carrier gear 280 is transmitted through the idler gear 281 directly to the spur gear 284. It is therefore evident that, as long as the accounting machine platen is held stationary, the spur gear 284 is caused to be driven either clockwise or counter-clockwise by the spur gear 231, depending upon whether a ledger card is being fed into or out of the machine carriage.

With reference now to FIG. 20, pinned to the leftmost extending end of the shaft 275 is a spur gear 285. As more clearly shown in FIG. 27, the spur gear 285 meshes with an idler gear 286, which, in turn, meshes with a spur gear 287, fixedly secured to the shaft 121 of the main platen. It is next assumed that there are no ledger cards being fed into or out of the machine carriage, so that the auxiliary platen 150, and hence the spur gear 231 (FIG. 20), are both locked against any rotational movement in the manner previously described in detail. With reference to FIG. 20, as the spur gear 231 is now assumed to be locked against rotational movement, the spur gear 274 and thus the sun gear 276 are also locked against rotational movement. Therefore, when the main platen 80 (FIG. 2) is subsequently rotated or is indexed from one posting line to another, corresponding rotation of the spur gear 287 (FIG. 27) is effected. The rotational movement of the spur gear 287 is transmitted to the ring gear 279 through the idler gear 286, the spur gear 285, and the shaft 275, to which the ring gear 279 is pinned. When the ring gear 279 is thus rotated clockwise or counter-clockwise by the main platen, the planetary gears 277 are effectively translated in an orbit around the shaft 275 due to the fact that the sun gear 276 is locked against rotational movement. In the same manner as previously described, translational movement of the planetary gears 277 is transmitted as rotational movement to the spur gear 284 through the plate 278, the planet carrier gear 280, and the idler gear 281.

From the foregoing, it is now evident that the spur gear 284 remains stationary as long as both the main platen and the auxiliary platen are stationary. However, when either the main platen or the auxiliary platen is subsequently rotated, the spur gear 284 is likewise caused to be rotated in the same direction as the particular platen being rotated. It is to be noted, however, that at no time during operation of the carriage or the card-handling equipment are both of the platens permitted to be rotated at the same time.

With reference now to FIGS. 15 and 31, the spur gear 284 is fixedly secured to a shaft 288, which is journaled at either end thereof in the back frame 205 and the end wall of the housing member 204. Pinned to the rightmost end of the shaft 288 is a coupling member, indicated generally as 289, which is also pinned to the leftmost end of a shaft 290, the shaft 290 being journaled at its opposite end in the bracket 201 and extending therethrough. Also pinned to the shaft 290 is a tubular sleeve-like bushing 291, which has a sleeve member 292 press-fitted thereon. A sleeve bearing member 295 is rotatably supported on the shaft 290 immediately to the right of the bushing 291 and has a sleeve member 296 pressed-fitted thereon. The sleeve member 296 is fixedly secured to the bracket 201 by means of screws 297 extending through the bracket 201 and threaded in the rightmost face of the sleeve member 296. Consequently, the sleeve member 296 is locked against rotational movement.

Press-fitted onto the outermost surface of the sleeve member 292 is a ring 298, which, as illustrated in FIG. 25, has ten bores radially formed therein, into each of which is disposed a spring member 299, which spring-biases a plunger 300 radially outwardly. The ring 298, along with the spring-biased plungers disposed therein, is positioned within a bore formed in a knurled knob 301. As shown, sixteen equally-spaced and triangularly-shaped notches are formed along the internal periphery of the bore of the knob 301. Consequently, a pair of diametrically opposite ones of the plungers 300 engage a next successive pair of diametrically opposite notches for each 4½ degrees angular displacement of the knob 301 with respect to the sleeve member 292. As illustrated in FIG. 31, a pair of insulating discs 302 and 303 are press-fitted into recesses formed in opposite faces of the knob 301 for reasons to be described in detail hereinafter.

Press-fitted onto the outermost surface of the sleeve member 296 is a ring 306, which also has ten bores radially formed therein, into each of which is disposed a spring member 307, which spring-urges a plunger 308 radially outwardly. The ring 306, along with the spring-biased plungers disposed therein, is positioned within a bore formed in a knurled knob 309. Although not illustrated, sixteen equally-spaced and triangularly-shaped notches are formed along the internal periphery of the bore of the knob 309 in exactly the same manner as just described with respect to the knob 301. Consequently, a next successive pair of diametrically opposite ones of the plungers 308 engage a next successive pair of diametrically opposite notches for each 4½ degrees angular displacement of the knob 309 with respect to the sleeve member 296. As shown, a pair of insulating discs 310 and 311 are press-fitted into recesses formed in opposite faces of the knob 309 for reasons to be described next.

As shown in FIG. 31, an insulating disc member 312 is secured to the leftmost face of the sleeve member 292 by means of screws 313 threaded therein. With reference to FIG. 15, a plurality of flexible Phosphor-bronze wiper blades 315 through 321 are fixedly secured to a shaft 322, which extends between and is fixedly secured at either end thereof to the back frame 205 and the bracket 201. An additional Phosphor-bronze wiper blade 323 is fixedly secured to the face of the insulating disc 310 and is adapted to engage the face surface of the insulating disc 303.

As partially illustrated in FIG. 15, the outer circumference of the "line find" knob 309 is calibrated with engraved numbers 1 through 61, each spaced apart from the others by 4½ degrees with respect to the axis of rotation of the knob 309, representing a total of sixty-two equally-spaced posting lines on the ledger card, as measured from top to bottom thereof. In a manner to be described hereinafter, if a "mechanical line-find" operation is executed by the computer, the ledger card is automatically positioned in the carriage of the machine on the posting line corresponding to the manual setting of the knob 309. However, if a "magnetic line-find" operation is executed by the computer, the ledger card is automatically positioned on the posting line, magnetically sensed from the ledger card by the line-find pick-up head, following the posting line indicated by the setting of the knob 309. The "card length" knob 301 is calibrated every 4½ degrees with numbers 15 through 60 and is manually settable to correspond to the maximum number of posting lines available on the particular ledger card being utilized during a particular posting operation.

With reference to FIG. 16, a circular commutation bar 325 is affixed to the outer face of the insulating disc 311 (as viewed in FIG. 31) and is adapted to be continually engaged by the wiper blade 321 during rotation of the line-find knob 309. A substantially pie-shaped commutator bar 326 is affixed to the outermost face of the insulating disc 310 (FIG. 31) and is electrically connected to the commutation bar 325 by means of a metallic pin 327. Additionally, the commutator bar 326 is electrically connected to the wiper blade 323 by means of metallic pins 328. As illustrated in FIG. 17, a circular commutator bar 329 is affixed to the outermost face of the insulating disc 302 and is adapted to be continually engaged by the wiper blade 319 during rotation of the card-length knob 301 (FIG. 15). The commutator 329 is provided with a rectangular extension 330, which is adapted to be engaged by the wiper blade 318. Also affixed to the outermost face of the insulating disc 302, along its outer circumference, is an arcuate commutator bar 331, which is adapted to be engaged by the wiper blade 317.

As illustrated in FIG. 18, affixed to the outermost face of the insulating disc 303 is a circular commutator bar 332, which is adapted to be continually engaged by the wiper blade 320 during rotation of the card-length knob 301. The commutator bar 332 is electrically connected to the commutator bar 331 (FIG. 17) by suitable pin connections, not shown, and is provided with a rectangular etxension 333, which is adapted to be engaged by the wiper blade 323. With reference to FIG. 19, affixed to the outermost surface of the insulating disc 312 is a circular commutator bar 334, which is adapted to be continually engaged by the wiper blade 315 and is provided with a rectangular extension 335, which is adapted to be engaged by the wiper blade 316.

With reference to FIGS. 29 and 31, a switch mechanism, indicated generally as 337, and adapted to be actuated by rotation of the shaft 290, comprises an insulating plate member 338, frictionally mounted on the shaft 290. Threaded in the outside face of the bracket 201 is a screw 340, which extends through an elongated slot 339, formed in the lower end of the plate member 338. Affixed to the insulating plate member 338 are a pair of diametrically opposite electrical terminals 341 and 342. A second insulating plate member, 343, is also frictionally mounted on the shaft 290. Rotational movement of the plate member 343 is prevented, however, by the action of a pin 344, which is affixed to the bracket 201 and extends through a fork formed in the upper end of the plate member 343. Formed on the inner face of the plate member 343 is an elongated commutator bar 345, which is adapted to short-circuit the terminals 341 and 342 upon subsequent rotation of the shaft 290. The plate member 343 is maintained in sliding engagement with the terminals 341 and 342 by means of a washer 346, a spring 347, and a collar pin 348.

It is therefore evident that the terminals 341 and 342 are short-circuited by the commutator 345 after the shaft 290 is subsequently rotated a predetermined angular distance, determined by the slot 339, and are maintained in a short-circuited condition during continued rotation of the shaft 290.

With reference to FIG. 15, a variable reluctance magnetic head 349, of a well-known variety such as that at present manufactured by Electro-Products Laboratories, Incorporated, as Model No. 3015-A, is threaded in the wall of the housing 204. The head 349 is secured in position by a lock nut 350, with its movable plunger 351 adapted to be periodically deflected longitudinally by the cam wheel 208. As previously mentioned, the card-drive motor 200 is of the synchronous type which rotates at a synchronous speed of 1,800 r.p.m. Consequently, due to the fact that the cam wheel 208 is provided with twelve teeth, as illustrated in FIG. 30, a 360 c.p.s. square-wave clock signal is generated in a well-known manner by the magnetic head 349 and appears across output line CLK to be utilized by the computer for synchronization purposes.

A detailed mode of operation will now be given with respect to the overall system in order to facilitate a more complete understanding and appreciation of the novel features and functions of various aspects of the unique magnetic ledger card handling device, as to its adaptability and applicability to be effectively utilized by substantially any of the various record-keeping machines, which are themselves to be utilized as input-output devices by electronic digital computing machines. Accordingly, reference is made to FIGS. 32 through 35, which, when combined, constitute an electrical schematic diagram of the control circuitry associated with the ledger card handling device. However, it is to be noted at the outset that all like-labeled control lines throughout FIGS. 32 through 35 are to be connected together in order to obtain a complete circuit diagram; for simplification purposes, many of the control lines are not actually shown drawn to all of the various connecting points.

Figure 33:
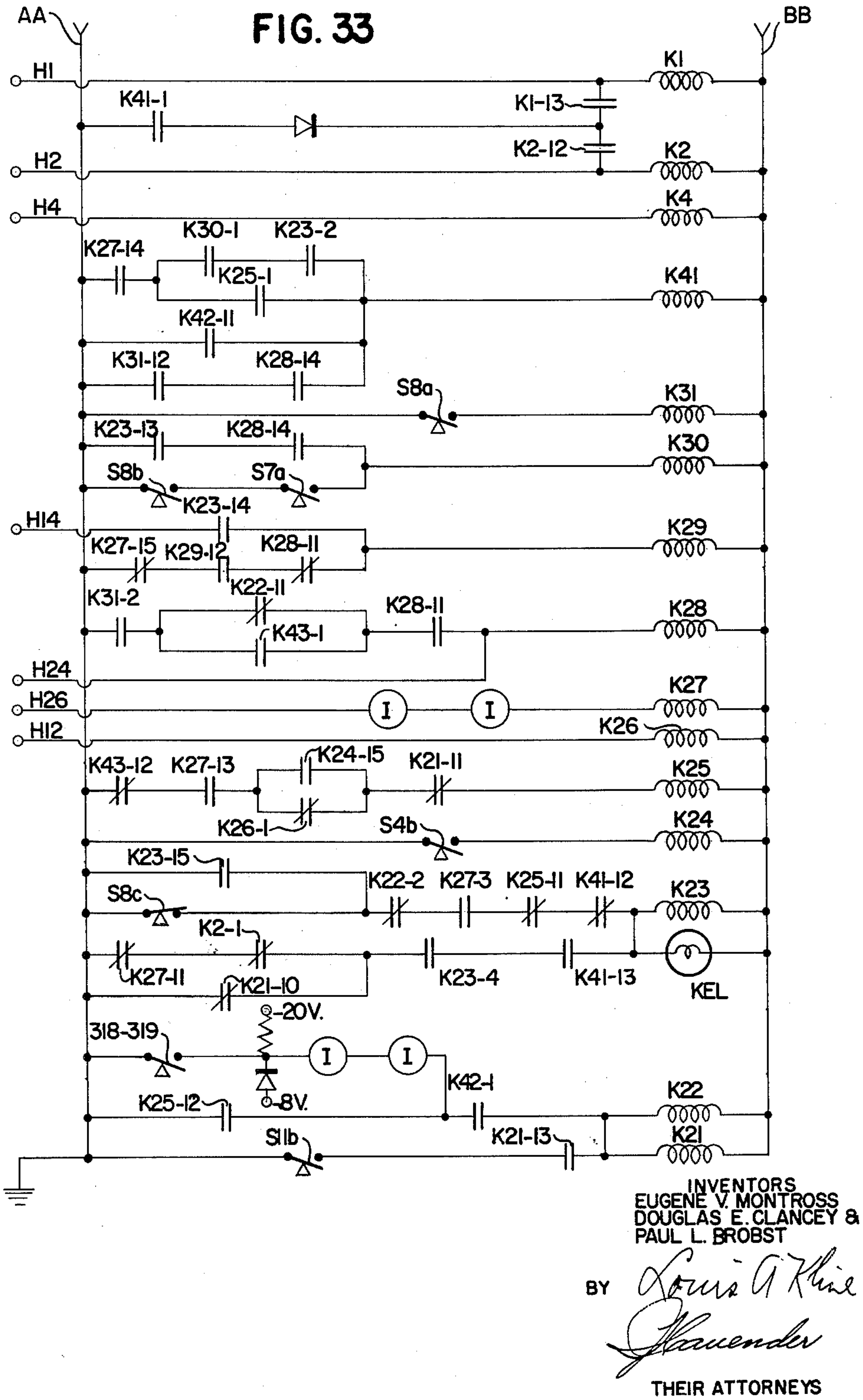

With continued reference to combined FIGS. 32 through 35, the card-drive motor 200 is energized when the main power switch SW1 is closed and thereafter rotates at a synchronous speed of 1,800 r.p.m. As previously described with respect to FIG. 15, energization of the motor 200 causes a 360 c.p.s. square-wave clock signal to be continuously generated, which appears at output lead CLK. As illustrated in FIG. 34, due to the fact that relay contacts K41–2 are normally closed and relay contacts K21–2 are normally open, the states of both of the inputs to logical AND 500 are simultaneously TRUE; i.e., at ground potential. Consequently, when the state of line CLK subsequently reverses from TRUE to FALSE, the state of the flip-flop 507 reverses, so that the state of line H14 is rendered FALSE—i.e., negative—and the states of lines H15 and H16 are simultaneously rendered TRUE.

It is first assumed that an "Enter-Cards-Words" with "Magnetic-Line-Find" operational instruction is to be executed in the same manner as fully described in the before-referred-to copending United States patent application Serial No. 859,598, so that line H26 (FIG. 32) is selectively rendered TRUE by the arithmetic and logical control portion of the computer circuitry. When line H26 is thus rendered TRUE, "Enter-Card-Words" relay coil K27 (FIG. 33) is energized, resulting in an opening of all normally-closed relay contacts having a "K27" prefix and a simultaneous closing of all normally-open relay contacts having a "K27" prefix, all in a conventional manner well known to those skilled in the art. Closure of contacts K27–3 (FIG. 33) causes relay coil K23 to be energized, and, simultaneously therewith, causes card-entry lamp KEL to be illuminated, thus indicating that the machine is properly conditioned to accept a ledger card from the operator. As a result of relay coil K23 thus being energized, contacts K23–15 close and thereby short-circuit switch contacts S8*c*, so that relay coil K23 remains energized even though contacts S8*c* are subsequently opened.

As previously described with respect to FIGS. 2 and 6, when a ledger card is subsequently inserted into the chute formed by the paper guide 126 and is thereafter moved down and around the platent 80, the leading edge of the card first deflects the arm 153 and thereby actuates switch S8. With reference back to FIG. 33, actuation of switch S8 results in a closure of contacts S8*a* and a subsequent energization of relay coil K31. When the ledger card is inserted further into the carriage, the arm 154 (FIG. 6) is deflected thereby and actuates switch S7. Actuation of switch S7 results in a closure of switch contacts S7*a*, which, in turn, causes relay coil K30 to be energized thereby.

As a result of contacts K30–1 (FIG. 33) thus being closed due to energization of relay coil K30, relay coil K41 is energized. Energization of relay coil K41 causes contacts K41–2 (FIG. 34) to open, resulting in the state of the reference input (i.e., via AND gate 510) to flip-flop 507 being rendered FALSE, causes contacts K41–3 (FIG. 32) to close, resulting in energization of relay coil K42, causes contacts K41–4 (FIG. 32) to close, resulting in energization of auxiliary tension solenoid L6, causes contacts K41–11 (FIG. 35) to open, resulting in the state of line H24 being rendered FALSE thereby, and causes contacts K41–13 (FIG. 33) to close and thereby maintain relay coil K23 energized and also maintain lamp KEL illuminated when contacts K41–12 are subsequently opened.

As previously described with respect to combined FIGS. 3 and 6, energization of solenoid L6 results in the main cam shaft 160 being slowly rocked clockwise by a maximum distance of approximately sixty degrees. Also, as previously described with respect to FIGS. 4 and 11, as a result of the shaft 160 being rocked clockwise approximately sixty degrees, the shaft 153 is first caused to be rocked clockwise and then is caused to be rocked counter-clockwise. As a result, the paper guide plates 183*a* through 183*d* (FIGS. 3 and 6) are first shifted outwardly and then are raised and thereafter maintained in a raised position. In addition, when the main cam shaft 160 is being slowly rocked clockwise, the shaft 166 (FIG. 6) is likewise being rocked clockwise thereby. As a result, the compression rollers 163*a* through 163*e* are simultaneously brought into engagement with the auxiliary drive platen 150 (FIG. 7), and, simultaneously therewith, the magnetic recording-reproducing heads 174*a* through 174*c* are simultaneously lowered into operative engagement with the magnetic strip on the ledger card. Due to the fact that the paper guide plates 183*a* through 183*d* are all pushed forward at the time the compression rollers 163*a* through 163*e* are brought into contact with the ledger card, any skew in the physical positioning of the ledger card is automatically corrected. At the end of the travel thereof, the paper guide plates are vertically raised out of contact with the leading edge of the ledger card. Also, at the end of the travel of solenoid L6, switch contacts S11*a* (FIG. 32) are opened, and contacts S11*b* (FIG. 33) are simultaneously closed.

As previously noted, relay coil K42 (FIG. 32) is energized simultaneously with energization of auxiliary tension solenoid L6. As a result of relay coil K42 thus being energized, contacts K42–11 (FIG. 33) close and thereby cause relay coil K41 to remain energized, and, simultaneously therewith, contacts K42–12 (FIG. 32) close and thereby cause relay coil K43 to be energized. As a result of relay coil K43 thus being energized, contacts K43–2 (FIG. 32) close and thereby effect energization of solenoid L2. It is to be noted that relays K41, K42, and K43 are each "time-delay" type relays having a time delay of 70–80 milliseconds; consequently, it is evident that solenoid L2 is energized approximately 140–160 milliseconds after solenoid L6 is energized.

As previously described with respect to FIGS. 2 and 27 when solenoids L1 and L2 are both de-energized, the auxiliary platen 150 is locked against rotational movement. However, when solenoid L2 is subsequently energized, the auxiliary platen 150 is thereafter caused to be rotated clockwise at a forward speed of approximately 300 r.p.m. Consequently, the ledger card is driven into the carriage, back into the chute 136, with the respective magnetic channels thereon being translated over the pick-up heads 174*a* through 174*d* (FIG. 36), which heads derive data, line-find, and synchronizing information therefrom in the same manner as fully described in the aforementioned copending United States patent application Serial No. 859,958.

With reference of FIGS. 16 through 19, when the auxiliary platen is rotated in a forward direction, the shaft 290 is slowly rotated counter-clockwise, as viewed. The gearing ratio between the auxiliary platen and the shaft 290 is so chosen that the commutator extension 330 engages the wiper blade 318 after the ledger card is driven a predetermined maximum distance into the carriage. At this point, the wiper blades 318 and 319 are electrically connected together, as symbolically represented by an equivalent closure of contacts 318—319 (FIG. 33). As a result of the closure of contacts 318—319, "reverse" relay coils K21 and K22 are both energized. Energization of relay coil K21 causes contacts K21–3*b* (FIG. 32) to close, resulting in relay coil K42 remaining energized, causes contacts K21–11 (FIG. 33) to open in order to prevent rejection of the ledger card via energization of relay coil K25, causes contacts K21–12 (FIG. 32) to close, resulting in energization of reversing solenoid L1, and causes contacts K21–13 (FIG. 33) to close and thereby maintain relay coils K21 and K22 energized.

In the same manner as previously described, the ledger card is brought to a sudden standstill when solenoid L1 is thus energized, and is immediately driven outwardly from the carriage. Also, just prior to reversal of the ledger card, the state of line H26 is rendered FALSE by the computer control circuitry and thereby causes relay coil K27 (FIG. 33) to be de-energized. When contacts K27–12 (FIG. 32) are thereby closed, solenoid L5 is energized and thereby maintains the paper guide plates 183*a* through 183*d* (FIGS. 3 and 6) in their raised positions.

Upon reversal of the direction of movement of the ledger card, the wiper blade 317 (FIG. 17) is electrically disconnected from the wiper blade 319, as represented by an equivalent opening of contacts 317–319 (FIG. 34), which causes the state of line (I32)′ to be rendered FALSE. Due to the fact that contacts K21–2 (FIG. 34) are closed, the state of line (I28)′ is likewise FALSE. With all of the inputs to logical OR 502 thus being FALSE, the state of output line H19 is likewise FALSE. With reference to FIG. 35, as line H19 is FALSE, the state of line (H19)′ is TRUE due to the inversion characteristics of the inverter 504. Due to the fact that contacts K23–3 (FIG. 35) are open, the state of line (I25)′ is rendered TRUE, resulting in the state of the output line from logical OR 505 being rendered TRUE also.

When the ledger card is translated outwardly from the carriage by a predetermined distance determined by the initial setting by the operator of the line-find knob 309 (FIG. 15), the wiper blade 323 (FIG. 18) engages commutator extension 333 and is thereby electrically connected to the wiper blade 320. With reference to FIG. 34, when contacts 320—323 are thus closed, the state of line I30 is thereby rendered TRUE. Consequently, at the next TRUE-to-FALSE reversal of state of line CLK, the state of flip-flop 506 is reversed, so that line KLF is rendered TRUE thereby. Upon detection by the line-find head 174*a* (FIG. 34) of a magnetic line-find discontinuity, the state of line V*m* is rendered TRUE by "read" amplifier 508, thus causing all of the inputs to logical AND 509 to be simultaneously TRUE for the first time, and thereby rendering the state of line H18 TRUE. When line H18 is thus rendered TRUE, all of the inputs to logical AND 503 (FIG. 35) are, for the first time, simultaneously TRUE and thereby render the state of line H17 TRUE.

With reference to FIG. 34, at the next TRUE-to-FALSE reversal of state of line CLK following line H17 being rendered TRUE, the state of flip-flop 507 is reversed, so that line H14 is rendered TRUE and lines H15 and H16 are simultaneously rendered FALSE. As a result of line H15 thus being rendered FALSE, aligner solenoid L2 (FIGS. 27 and 32) is de-energized and thereby causes the ledger card to immediately be brought to a sudden standstill. Approximately 70–80 milliseconds after line H16 is thus rendered FALSE, relay coil K43 (FIG. 32) is de-energized, and, approximately 70–80 milliseconds after relay coil K43 is de-energized, relay coil K42 is de-energized also. As a result of line H14 thus being rendered TRUE, relay coil K29 is energized, contacts K29–1 (FIG. 32) are thus closed, and solenoid L4 is energized and thereby prevents the compression roller 163*e* (FIG. 6) and the magnetic heads 174*a* through 174*c* from being removed from operative engagement with the ledger card when the remaining ones of the compression rollers are subsequently raised. Approximately 70–80 milliseconds after relay coil K42 is de-energized, so that contacts K42–11 (FIG. 33) are opened, relay coil K41 is de-energized and thereby causes solenoid L6 (FIG. 32) to be de-energized likewise. As previously described, when solenoid L1 is de-energized, contacts S11*b* (FIG. 33) open, thus causing relay coils K21 and K22 to be de-energized and their contacts to resume their original conditions. When the relay coils K21 and K22 are de-energized, line H26 is rendered FALSE by the computer control circuitry, thus causing "Enter Card Words" relay coil K27 (FIG. 33) to be de-energized, thereby completing the "Enter-Card-Words" sequence of events and thereafter permitting the computer to perform the next input or output instruction programmed by the operator.

However, if an "Enter-Card-Words" with "Mechanical-Line-Find" operational instruction is to be executed, line H1 (FIG. 32) is rendered TRUE simultaneously with line H26. Therefore, when line H1 is subsequently rendered TRUE, relay coil K1 (FIG. 33) is energized and thereby causes closure of contacts K1–11 (FIG. 35). When line I30 (FIG. 34) is subsequently rendered TRUE by closure of switching contacts 320—323, line I29 (FIG. 35) is immediately rendered TRUE, and, as a result, all of the inputs to logical AND 503 are simultaneously rendered TRUE and thereby cause output line H17 to likewise be rendered TRUE. Thus, aligner solenoid L2 is de-energized and causes the ledger card to be immediately brought to a standstill even though a line-find mark has not been detected. As previously described, the detection of a recorded line-find mark is indicated by line H18 (FIG. 34) being rendered TRUE.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. A record feeding device for controlling the transport of a record sheet comprising: a plurality of rotatably supported sun members; a rotatably supported planet carrier; record-feeding platen means driven by said planet carrier; a planetary member in operative engagement with each of said sun members and journaled in said planet carrier adjacent the axis of rotation thereof; a rotatably supported ring member, the internal surface of which is in operative engagement with said planetary member; means for selectively arresting rotational movement of said ring member such that, upon rotation in one direction of a selected one of said sun members, said planetary member is effectively translated in a fixed orbit around said sun members and said planet carrier is thereby caused to be rotated in one direction; and means for selectively arresting rotational movement of a different one of said sun members such that, upon rotation in said one direction of said selected one of said sun members, said planetary member is effectively translated in a fixed orbit in an opposite direction around said sun members and said planet carrier is thereby caused to be rotated in an opposite direction.

2. A record feeding device for controlling the transport of a record sheet comprising: a plurality of axially aligned and rotatably supported sun members; a rotatably supported planet carrier; record-feeding platen means driven by said planet carrier; a plurality of planetary members each in operative engagement with each of said sun members and each journaled in said planet carrier along an imaginary circle whose origin is coincident with the axis of rotation of said planet carrier; a rotatably supported ring member, the internal surface of which is in operative engagement with each of said planetary members; means for selectively arresting rotational movement of said ring member such that, upon rotation in one direction of a selected one of said sun members, said planetary members are effectively translated in a fixed orbit around said sun members and said planet carrier is thereby caused to be rotated in one direction; and means for selectively arresting rotational movement of a different one of said sun members such that, upon rotation in said one direction of said selected one of said sun members, said planetary members are effectively translated in a fixed orbit in an opposite direction around said sun members and said planet carrier is thereby caused to be rotated in an opposite direction.

3. A record feeding device for controlling the transport of a record sheet comprising: a main driving shaft; means for rotating said driving shaft in one direction; a first and a second rotatably supported sun member, said second sun member being driven by said driving shaft; a first and second rotatably supported planetary member, each in operative engagement with both of said sun members; a rotatably supported ring member in operative engagement with both of said planetary members; rotatable means, rotatably supporting said planetary members in fixed locations with respect to each other; means for selectively arresting rotational movement of said ring member whereby said planetary members are effectively translated in a fixed orbit in one direction around said sun members and said rotatable means is thereby rotated in one direction; means for selectively arresting rotational movement of said first sun member whereby said planetary members are effectively translated in a fixed orbit in an opposite direction around said sun members and said rotatable means is thereby rotated in an opposite direction; and record feeding platen means driven by said rotatable means.

4. A record feeding device for controlling the transport of a record sheet comprising: a plurality of rotatably supported sun gears; a rotatably supported planet carrier; record feeding platen means driven by said planet carrier; a planetary gear in operative engagement with each of said sun gears and journaled in said planet carrier adjacent the axis of rotation thereof; a rotatably supported ring gear in operative engagement with said planetary gear; means for selectively arresting rotational movement of said ring gear such that, upon rotation in one direction of a selected one of said sun gears, said planetary gear is effectively translated in a fixed orbit around said sun gears and said planet carrier is thereby caused to be rotated in one direction; and means for selectively arresting rotational movement of a different one of said sun gears such that, upon rotation in said one direction of said selected one of said sun gears, said planetary gear is effectively translated in a fixed orbit in an opposite direction around said sun gears and said planet carrier is thereby caused to be rotated in an opposite direction.

5. A record feeding device for controlling the transport of a record sheet comprising: a plurality of axially aligned and rotatably supported sun gears; a rotatably supported planet carrier; record feeding platen means driven by said planet carrier; a plurality of planetary gears each in operative engagement with said sun gears and each journaled in said planet carrier along an imaginary circle whose origin is coincident with the axis of rotation of said planet carrier; a rotatably supported ring gear in operative engagement with each of said planetary gears; means for selectively arresting rotational movement of said ring gear such that, upon rotation in one direction of a selected one of said sun gears, said planetary gears are effectively translated in a fixed orbit around said sun gears and said planet carrier is thereby caused to be rotated in one direction; and means for selectively arresting rotational movement of a different one of said sun gears such that, upon rotation in said one direction of said selected one of said sun gears, said planetary gears are effectively translated in a fixed orbit in an opposite direction around said sun gears and said planet carrier is thereby caused to be rotated in an opposite direction.

6. A record feeding device for controlling the transport of a record sheet comprising: a main driving shaft; means for rotating said driving shaft in one direction; a first and a second rotatably supported sun gear, said second sun gear being driven by said driving shaft; a first and second rotatably supported planetary gear, each in operative engagement with both of said sun gears; a rotatably supported ring gear in operative engagement with both of said planetary gears; rotatable means, rotatably supporting said planetary gears in fixed locations with respect to each other; means for selectively arresting rotational movement of said ring gear whereby said planetary gears are effectively translated in a fixed orbit in one direction around said sun gears and said rotatable means is thereby rotated in one direction; means for selectively arresting rotational movement of said first sun gear whereby said planetary gears are effectively translated in a fixed orbit in an opposite direction around said sun gears and said rotatable means is thereby rotated in an opposite direction; and record feeding platen means driven by said rotatable means.

7. A record feeding device in accordance with claim 1, wherein each of said arresting means comprises an electrically-energizable solenoid operable means.

8. A record feeding device for controlling the transport of a record sheet comprising: a main driving shaft; means for rotating said main driving shaft in one direction; a first and a second sun gear, said first sun gear being rotatably supported by said driving shaft and said second sun gear being affixed to said driving shaft; a pair of planetary gears, each in engagement with both of said sun gears; a ring gear in engagement with both of said planetary gears; rotatable means, rotatably supporting said planetary gears in fixed locations with respect to each other along an imaginary circle whose origin is coincidental with the axis of rotation of said rotatable means; electrically energizable means for selectively arresting rotational movement of said ring gear, whereby said planetary gears are both effectively translated in a common orbit in one direction around said sun gears and said rotatable means is thereby rotated in one direction; electrically energizable means for selectively arresting rotational movement of said first sun gear, whereby said planetary gears are effectively translated in the same common orbit in an opposite direction around said sun gears and said rotatable means is thereby rotated in the opposite direction; and record feeding platen means driven by said rotatable means.

9. A record feeding device for controlling the transport of a record sheet whose recording surface is effectively divided into a plurality of adjacent recording zones and having a magnetic marking disposed within each of said recording zones, comprising: means for manually selecting a predetermined one of said recording zones; transducing means for generating an electrical signal in response to a magnetic marking being translated contiguously thereof; means for transporting said record sheet contiguous to said transducing means whereby a plurality of electrical signals are sequentially generated therein with each being indicative of a corresponding one of said magnetic markings; control means coupled to said transducing means and operative to arrest movement of said record sheet in response to any one of said electrical signals; and means for rendering said control means operative when the selected zone of said record sheet is at a predetermined position.

10. A record feeding device for controlling the transport of a record sheet whose recording surface is effectively divided into a plurality of adjacent recording zones, and which sheet includes a magnetizable strip vertically oriented along the margin thereof having a magnetic marking disposed therein adjacent each of said recording zones, comprising: means for manually selecting a predetermined one of said recording zones; magnetic reproducing means for generating an electrical impulse in response to a magnetic marking being translated thereover; means for transporting said record sheet over said reproducing means whereby a plurality of similar electrical impulses are sequentially generated therein with each impulse being indicative of a corresponding one of said magnetic markings; control means coupled to said reproducing means and operative to arrest movement of said record sheet in response to generation of any one of said impulses; and means for rendering said control means operative when the selected zone of said record sheet is at a predetermined transported position.

11. A record feeding device for controlling the transport of a record sheet comprising: a plurality of rotatably supported sun members; a rotatably supported planet carrier having two sets of ratchet type teeth and a pawl for each set of ratchet teeth, the stop surfaces of one set of teeth being disposed in opposite directions with respect to the stop surfaces of the other set of ratchet teeth, each set of ratchet teeth being arranged to coact with a corresponding pawl to selectively terminate rotation of said planet carrier in a selected one of two directions; record feeding platen means driven by said planet carrier; a planetary member in operative engagement with each of said sun members and journaled in said planet carrier adjacent the axis of rotation thereof; a rotatably supported ring member, the internal surface of which is in operative engagement with said planetary member; means including means for removing a selected one of said pawls from engagement with the corresponding set of ratchet teeth and for simultaneously arresting rotational movement of said ring member, such that, upon rotation in one direction of a selected one of said sun members, said planetary member is effectively translated in a fixed orbit around said sun members and said planet carrier is thereby caused to be rotated in one direction; and means including means for selectively removing the other one of said pawls from engagement with the other corresponding set of ratchet teeth and for simultaneously arresting rotational movement of a different one of said sun members, such that, upon rotation in said one direction of said selected one of said sun members, said planetary member is effectively translated in a fixed orbit in an opposite direction around said sun members and said planet carrier is thereby caused to be rotated in an opposite direction.

References Cited in the file of this patent

UNITED STATES PATENTS

| | | |
|---|---|---|
| 2,244,252 | Keen | June 3, 1941 |
| 2,831,560 | Oberholzer et al. | Apr. 22, 1958 |
| 2,936,870 | Schmidt | May 17, 1960 |